(12) United States Patent
Furusho

(10) Patent No.: US 7,467,130 B2
(45) Date of Patent: Dec. 16, 2008

(54) METHOD FOR CONVERTING CHAINED JOIN TABLES TO TREE STRUCTURE, AND A PROGRAM FOR CONVERTING THE SAME

(75) Inventor: Shinji Furusho, Yokohama (JP)

(73) Assignee: Turbo Data Laboratories, Inc., Kanagawa (JP)

( * ) Notice: Subject to any disclaimer, the term of this patent is extended or adjusted under 35 U.S.C. 154(b) by 446 days.

(21) Appl. No.: 10/532,495

(22) PCT Filed: Oct. 23, 2003

(86) PCT No.: PCT/JP03/13558

§ 371 (c)(1),
(2), (4) Date: Sep. 26, 2005

(87) PCT Pub. No.: WO2004/038612

PCT Pub. Date: May 6, 2004

(65) Prior Publication Data

US 2006/0059197 A1    Mar. 16, 2006

(30) Foreign Application Priority Data

Oct. 24, 2002    (JP) .............................. 2002-309680

(51) Int. Cl.
  G06F 17/30    (2006.01)
  G06F 17/00    (2006.01)
(52) U.S. Cl. ...................... 707/3; 707/1; 707/4; 707/6; 707/103 Y
(58) Field of Classification Search ...................... 707/1, 707/3, 4, 6, 103 Y
See application file for complete search history.

(56) References Cited

U.S. PATENT DOCUMENTS 5,857,180 A * 1/1999 Hallmark et al. ............... 707/2

(Continued)

FOREIGN PATENT DOCUMENTS

JP    2000-339390    12/2000

(Continued)

OTHER PUBLICATIONS

Norio Doi, "LFM o Tsukatta Kosoku In Memory XML Database Karearea", No. 21, Apr. 2002, pp. 24-27.

(Continued)

*Primary Examiner*—Don Wong
*Assistant Examiner*—Thanh-Ha Dang
(74) *Attorney, Agent, or Firm*—Griffin & Szipl, P.C.

(57) ABSTRACT

Concatenated join tables are converted into a tree structure at a high speed. First, table-formatted data is divided into one or more information blocks consisting of a value list containing item values in the sequence of the item value numbers corresponding to item values belonging to particular items and a pointer sequence containing pointer values for indicating the item value numbers in the sequence of the unique record number. Next, table-formatted data whose items are to be made common are selected, value lists of a predetermined item are made equivalent, and join is executed. Join is repeated between necessary table-formatted data. Next, among the concatenated table data, one which is to be a root is selected. According to the table-formatted data concatenation, depth of the table-formatted data is decided. According to the table-formatted data concatenation and depth, a value indicating a record is arranged on a tree description table describing the tree.

8 Claims, 34 Drawing Sheets

U.S. PATENT DOCUMENTS

| | | | | | |
|---|---|---|---|---|---|
| 6,154,747 | A | * | 11/2000 | Hunt | 707/100 |
| 6,553,383 | B1 | * | 4/2003 | Martin | 707/102 |
| 6,721,751 | B1 | * | 4/2004 | Furusho | 707/100 |
| 2002/0156814 | A1 | * | 10/2002 | Ho | 707/514 |
| 2003/0061244 | A1 | * | 3/2003 | Hirohata | 707/200 |
| 2004/0236762 | A1 | * | 11/2004 | Chaudhuri et al. | 707/100 |

FOREIGN PATENT DOCUMENTS

WO  WO 00/10103  2/2000

OTHER PUBLICATIONS

International Search Report issued in corresponding International Patent Application No. PCT/JP03/13558 completed Jan. 26, 2004 and mailed Feb. 10, 2004.

* cited by examiner

Fig.10

| Depth | Rec No | |
|---|---|---|
| 0 | 0 | ← 1000 |
| 1 | 0 | ← 1001 |
| 2 | 0 | ← 1002 |
| 2 | 7 | ← 1003 |
| 1 | 3 | ← 1004 |
| 2 | 3 | ← 1005 |
| 2 | 8 | ← 1006 |
| 1 | 4 | ← 1007 |
| 2 | 5 | ← 1008 |
| 0 | 1 | ← 1009 |
| 1 | 1 | ← 1010 |
| 2 | 1 | ← 1011 |
| 2 | 6 | ← 1012 |
| 1 | 5 | ← 1013 |
| 2 | 2 | ← 1014 |
| 0 | 2 | ← 1015 |
| 1 | 2 | ← 1016 |
| 2 | 4 | ← 1017 |

900

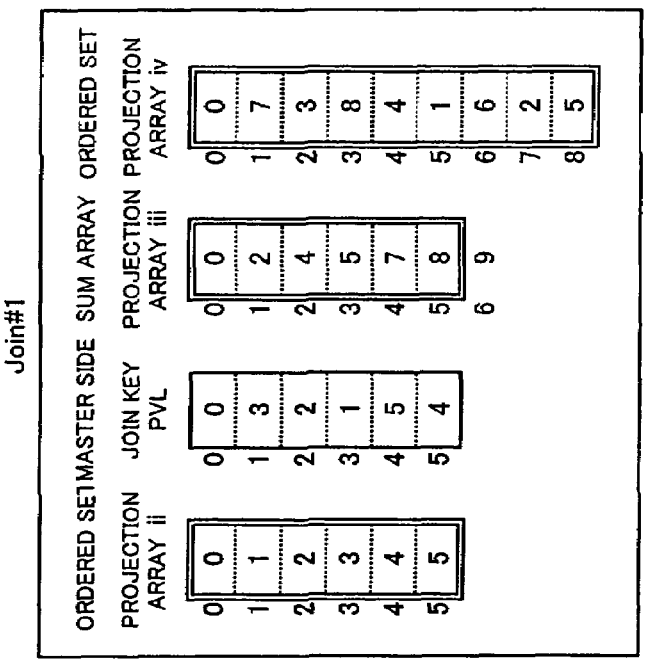
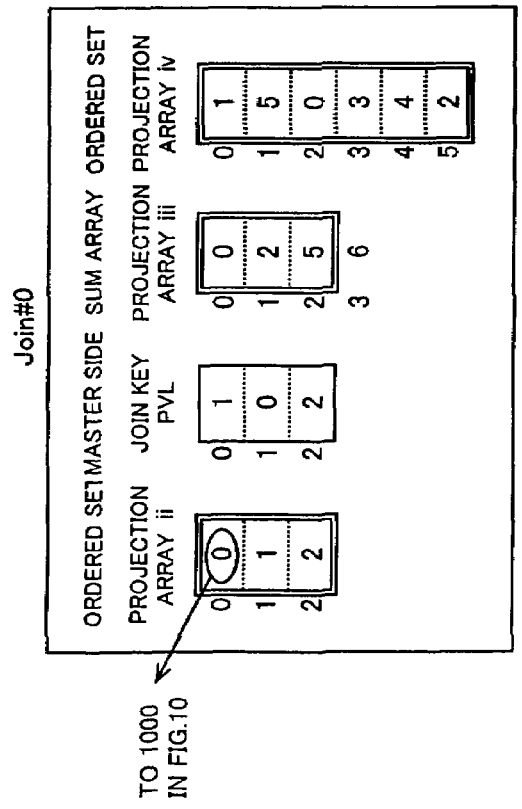
Fig.11

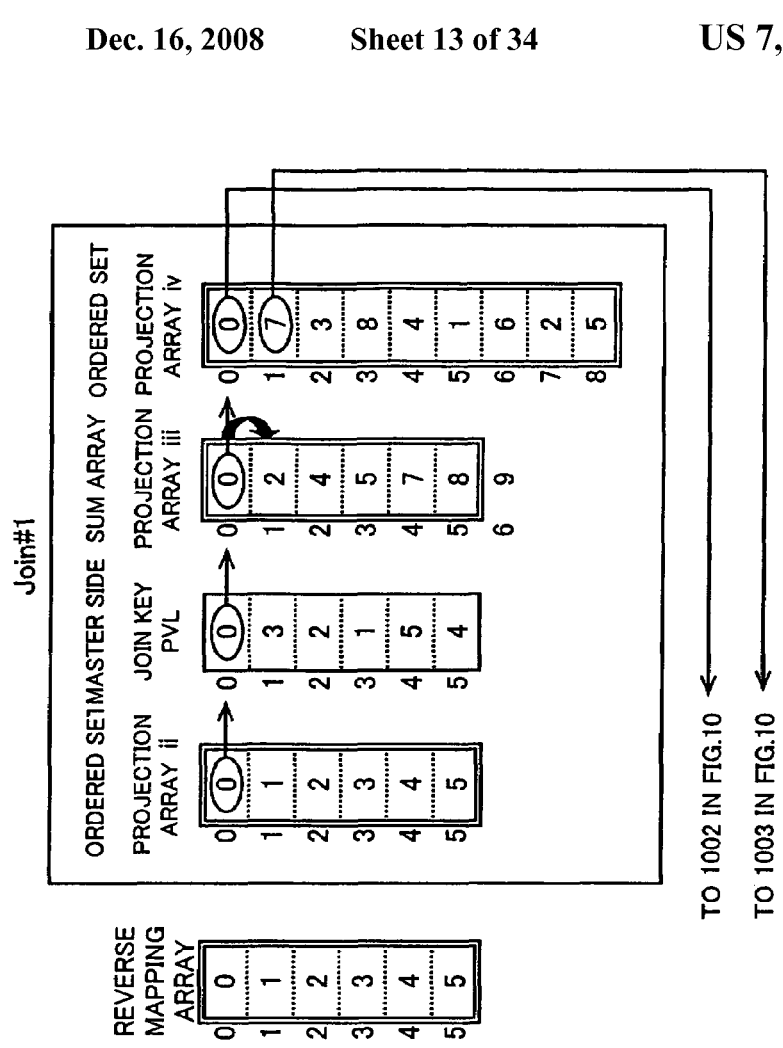
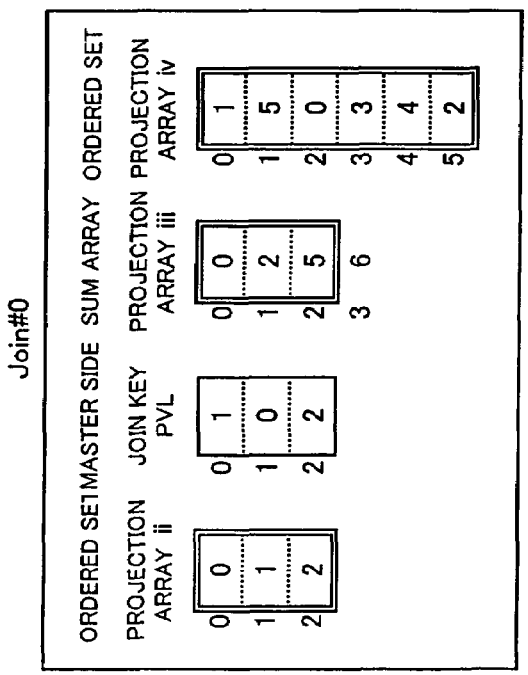
Fig.13

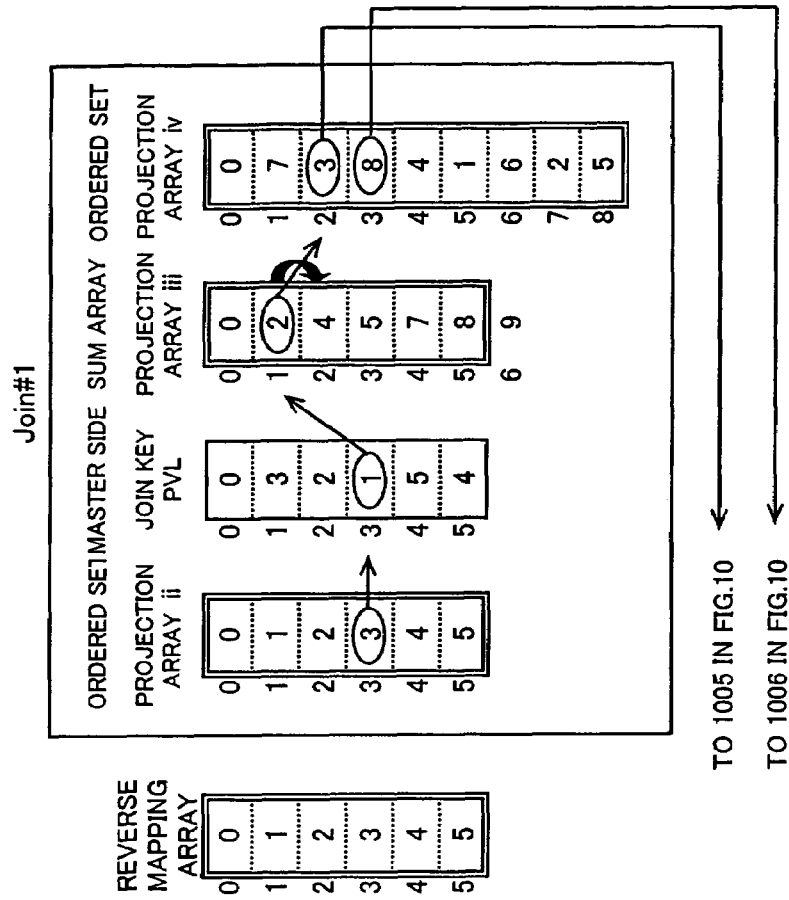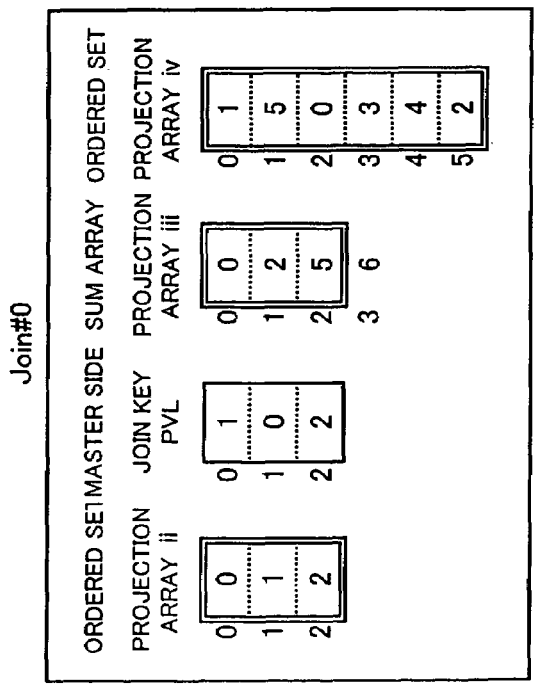
Fig.15

Fig.17

Fig.18
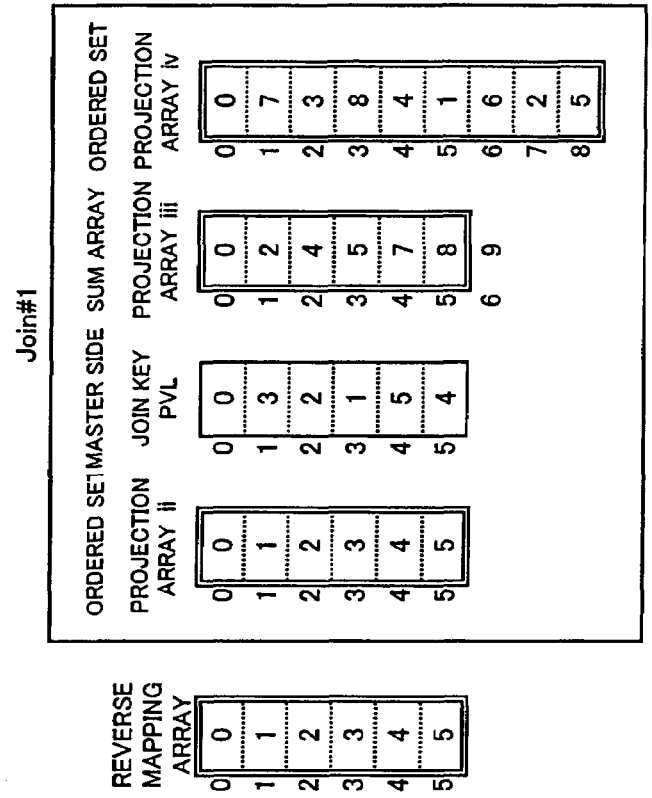
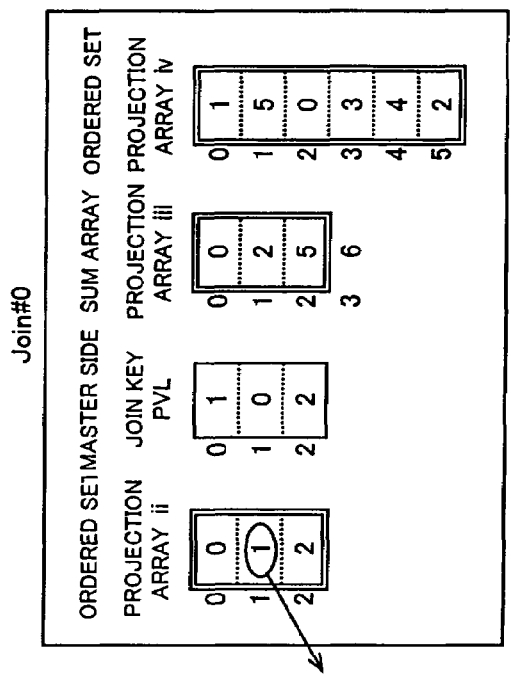

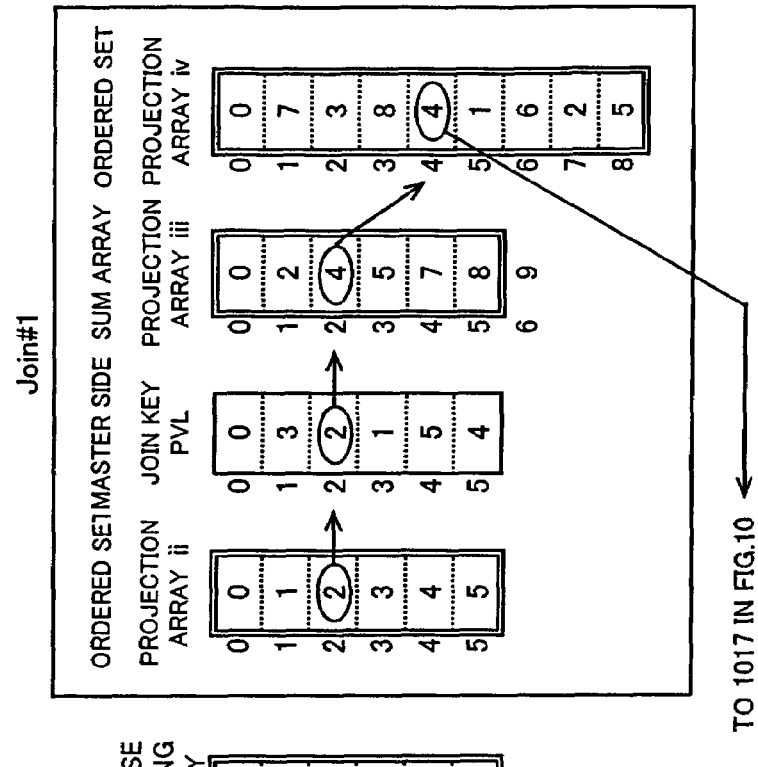
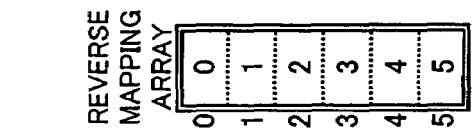
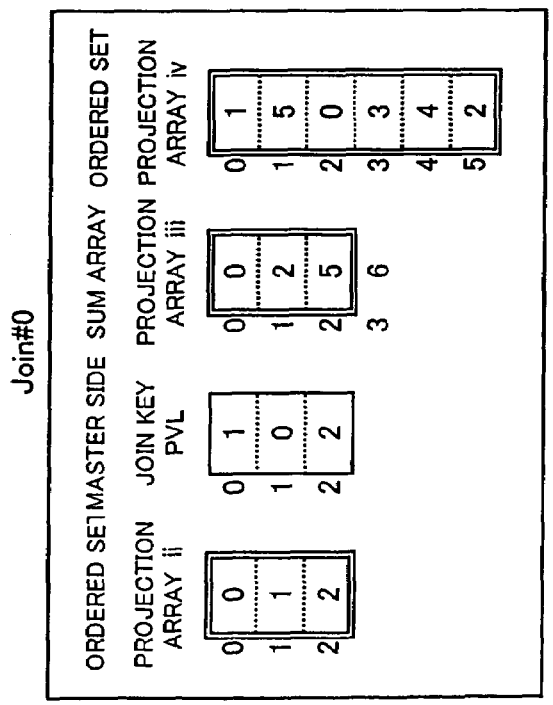
Fig.19

Fig.21

ORGANIZATION TABLE

| | ORGANIZATION NAME |
|---|---|
| 0 | TOKYO HEAD OFFICE |
| 1 | OSAKA BRANCH OFFICE |
| 2 | NAGOYA OFFICE |

(TABLE #0)

WHOLE SET WITHOUT SORTING

| 0 | 1 | 2 |
|---|---|---|
| 1 | 0 | 2 |

2101

| | PVL | ORGANIZATION NAME VL |
|---|---|---|
| 0 | 1 | OSAKA BRANCH OFFICE |
| 1 | 0 | TOKYO HEAD OFFICE |
| 2 | 2 | NAGOYA OFFICE |

EMPLOYEE CAREER TABLE

| | R NAME | PROJECT |
|---|---|---|
| 0 | MR./MS.A | Prj-1 |
| 1 | MR./MS.D | Prj-1 |
| 2 | MR./MS.E | Prj-1 |
| 3 | MR./MS.B | Prj-2 |
| 4 | MR./MS.C | Prj-2 |
| 5 | MR./MS.F | Prj-3 |
| 6 | MR./MS.D | Prj-3 |
| 7 | MR./MS.A | Prj-4 |
| 8 | MR./MS.B | Prj-4 |

(TABLE #2)

WHOLE SET WITHOUT SORTING — 2301

| | |
|---|---|
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |

301

| | PVL | | R NAME | VL |
|---|---|---|---|---|
| 0 | 0 | | 0 | MR./MS.A |
| 1 | 3 | | 1 | MR./MS.B |
| 2 | 4 | | 2 | MR./MS.C |
| 3 | 1 | | 3 | MR./MS.D |
| 4 | 2 | | 4 | MR./MS.E |
| 5 | 5 | | 5 | MR./MS.F |
| 6 | 3 | | | |
| 7 | 0 | | | |
| 8 | 1 | | | |

311

PROJECT

| | PVL | | | VL |
|---|---|---|---|---|
| 0 | 0 | | 0 | Prj-1 |
| 1 | 0 | | 1 | Prj-2 |
| 2 | 0 | | 2 | Prj-3 |
| 3 | 1 | | 3 | Prj-4 |
| 4 | 1 | | | |
| 5 | 2 | | | |
| 6 | 2 | | | |
| 7 | 3 | | | |
| 8 | 3 | | | |

Fig.27

| Depth | Rec No |
|-------|--------|
| 0 | 0 | ← 2700
| 0 | 1 | ← 2701
| 1 | 1 | ← 2702
| 2 | 1 | ← 2703
| 2 | 6 | ← 2704
| 1 | 5 | ← 2705
| 2 | 2 | ← 2706
| 0 | 2 | ← 2707
| 1 | 2 | ← 2708
| 2 | 4 | ← 2709

2600

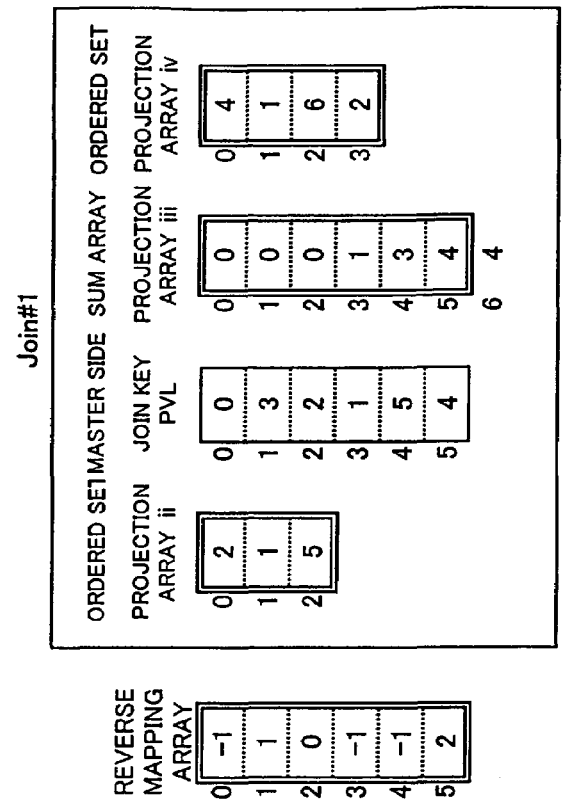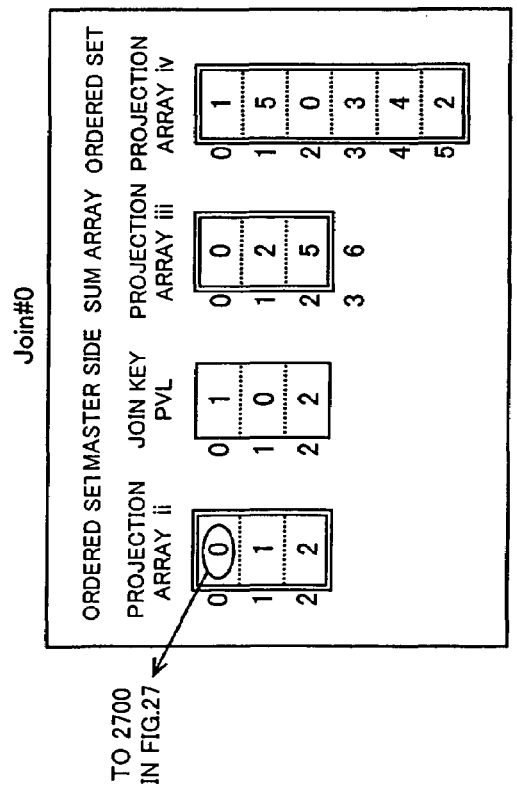
Fig.28

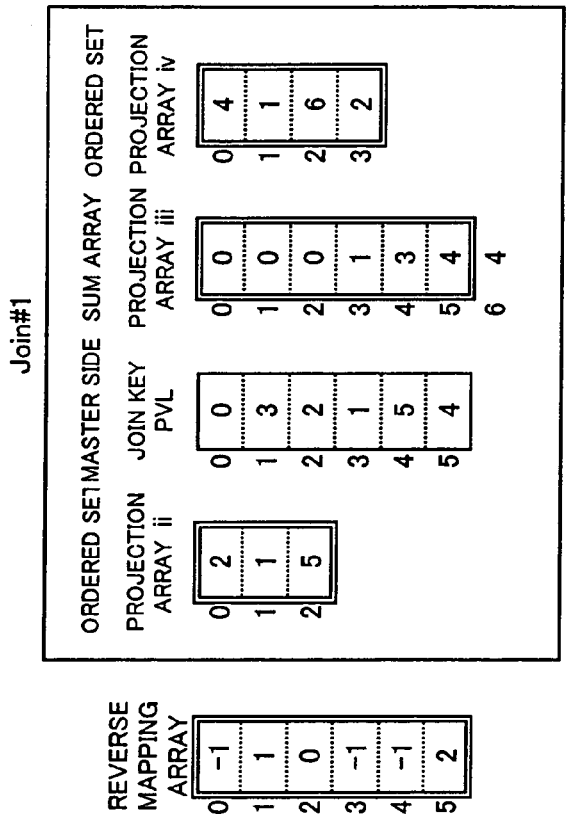
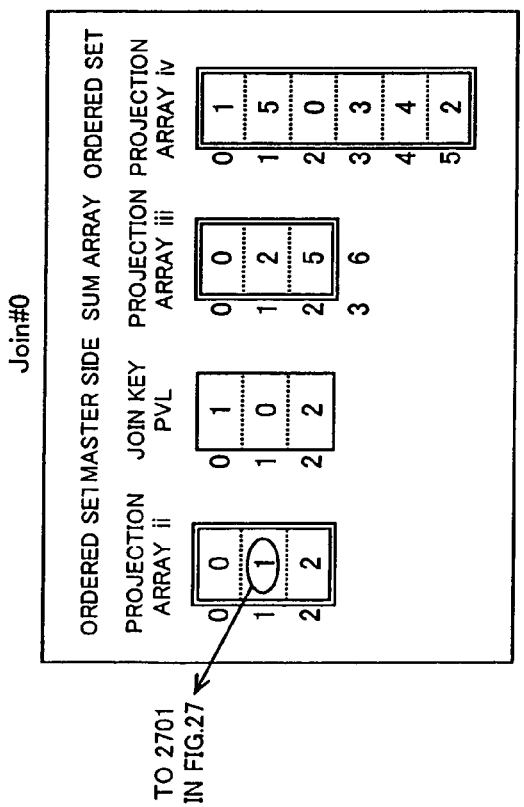
Fig.30

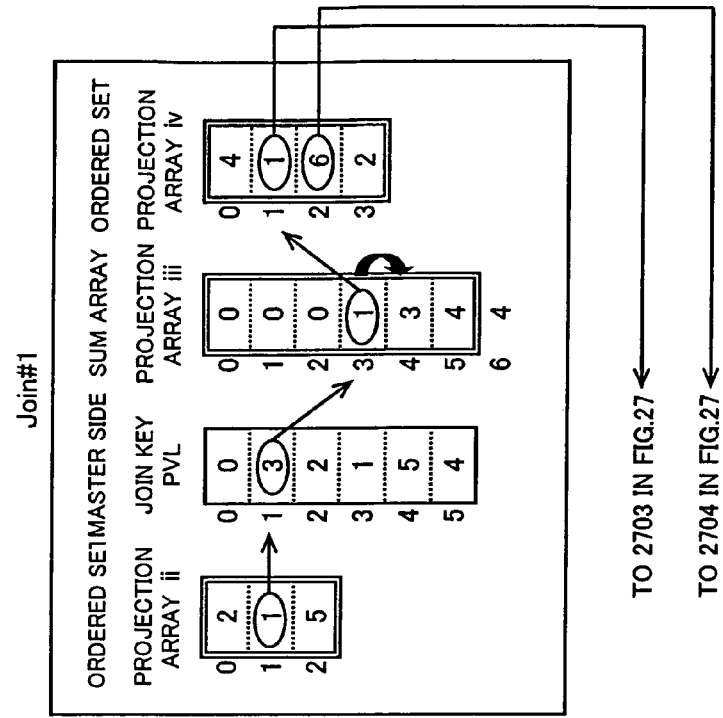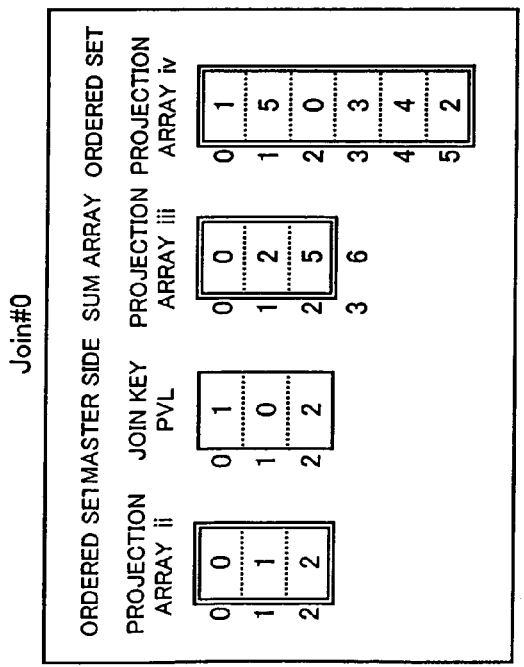
Fig.32

METHOD FOR CONVERTING CHAINED JOIN TABLES TO TREE STRUCTURE, AND A PROGRAM FOR CONVERTING THE SAME

This is a National Phase Application in the United States of International Patent Application No. PCT/P03/013558, filed Oct. 23, 2003, which claims priority on Japanese Patent Application No. 2002-309680, filed Oct. 24, 2002. The entire disclosures of the above patent applications are hereby incorporated by reference.

TECHNICAL FIELD

This invention relates to a technique of converting chained join tables to a tree structure at a high speed.

BACKGROUND ART

Databases are used for various purposes. In medium-scale or large-scale systems, relational databases (RDB) that can eliminate logical contradictions are mainly used. Since an RDB fundamentally includes an entry and its value, and a pointer to the value of another entry associated with the former value, it is not easy to convert the RDB to a tree structure. Particularly when a large volume of data must be handled, many relations occur in the RDB. The volume of data significantly increases and the processing is time-consuming.

On the other hand, object-oriented databases such as XML database are proposed. This object-oriented database first saves data in a tree structure and enables sequential tracing of the branches of the tree.

However, in the tree structure of the conventional database has the following problems.

(1) The Root is Fixed.

Since the conventional tree structure includes a pointer from a specified node to another specified node, it is possible to change the link between nodes. Also, the pointer can only trace in one direction. Therefore, while logically, any element of the tree may be its root, the root is actually fixed.

(2) The Tree Structure is Fixed.

Each node has various attributes. For example, in the case where entries of office address and home address exist, a tree based on the office address (for example, Japan—Tokyo—Minato Ward . . . ) and a tree based on the home address (for example, Japan—Kanagawa Prefecture—Yokohama City . . . ) constitute logically separate trees. However, in the tree structure of the conventional database, it is impossible to construct these separate trees.

(3) The Processing Speed is Very Low, and Sorting and Totaling are Difficult.

Search processing takes a very long processing time because the tree must be traced sequentially. Also, since the tree must be similarly traced sequentially to specify an element, sorting and totaling are difficult.

Meanwhile, the present inventor has invented a technique of dividing table-format data into one or more information blocks, each containing a value list in which entry values belonging to specified entries are stored in order of entry value numbers corresponding to the entry values and a pointer array in which pointer values for indicating the entry value numbers are stored in univocal order of record numbers, and then sequentially tracing the record numbers, elements (pointer values) situated at positions in the pointer array corresponding to the record numbers, and elements (entry values) situated at positions in the value list indicated by the pointer values, thereby specifying the entry values corresponding to the record numbers, as described in the pamphlet of International Publication WO00/10103 (FIG. 3 and FIG. 4)

By employing such a data format, it is possible to realize search, totaling, sorting and the like at a very high speed, compared with the conventional RDB.

The present inventor has also proposed a technique of joining plural tables that employ the above-described data format, as disclosed in JP-A-2000-339390 (pages 14 to 17, and FIGS. 10 to 18).

This makes it possible to join plural tables by using entries having a common entry value as keys, and to easily realize search and totaling of the join tables.

Knowing that one or more tree structures can be constructed by utilizing the techniques disclosed in International Publication WO00/10103 and JP-A-2000-339390, the present inventor has realized this. According to this method and program, the above-described problems (1) to (3) are solved and a tree structure containing various entries can be constructed from an arbitrary root. Also, the processing speed is high, and totaling and sorting can be realized.

In short, it is an object of this invention to provide a method and program that makes it possible to select an arbitrary root, construct one or more desired tree structures at a high speed, and execute search, totaling and sorting at a high speed.

DISCLOSURE OF THE INVENTION

The object of this invention is achieved by a method of connecting plural table-format data, each being expressed as a record array containing an entry and an entry value included in the entry, and converting the connected table-format data as join tables to a tree structure, the method characterized by including:

a) a step of dividing each table-format data into one or more information blocks, each containing a value list in which entry values belonging to specified entries are stored in order of entry value numbers corresponding to the entry values and a pointer array in which pointer values for indicating the entry value numbers are stored in univocal order of record numbers;

b) a step of selecting two table-format data in which an entry should be made common;

c) a step of finding an entry that should be made common in the selected two table-format data;

d) a step of determining table-format data on which default sorting order is reflected, as master table-format data, of the specified information blocks, and determining the other table-format data as slave table-format data;

e) a step of associating a record the master side with a corresponding record on the slave side in the selected table-format data in the case where the value lists contained in the specified information blocks are equalized with each other;

f) a step of selecting two other table-format data that regard the table-format data on the slave side of the former two table-format data, as the master side, and executing the step c) of finding an entry, the step d) of determining master table-format data and slave table-format data, and the step e) of associating, with respect to the other two table-format data;

g) a step of repeating the step f) with respect to table-format data that need to be joined;

h) a step of selecting table-format data to be a root from the table-format data connected by joining, and determining depth of each table-format data in accordance with the connection of the table-format data;

i) a step of securing an area for a tree description table having a combination of the depth and a record number, as a value;

j) a step of specifying a record having certain depth that is initially the smallest depth, and arranging a value indicating the record together with the depth into the area for the tree description table;

k) a step of specifying a record of the table-format data on the slave side from the specified record, and arranging, on the basis of the record, a value indicating a record of table-format data that regards the table-format data on the slave side as the master side, together with the depth of the table-format data on the master side, into the area for the tree description table;

l) a step of repeating the step k) until depth where no table format data exist is reached or until no record exists any longer; and m) a step of repeating the steps j) to l) to arrange a value specifying predetermined depth and record into the area for the tree description table, and thus completing the tree description table.

According to this invention, a set of two table-format data are chained and a record of table-format data at a deeper position is sequentially specified from a record of table-format data having a smaller depth. This enables creation of a tree description table including values indicating the depth and record. The depth in the tree description table specifies table-format data and the value indicating the record enables acquisition of the actual value of the table-format data. Selection of table-format data, combination of table-format data to be changed, and selection table-format data to be a root can be freely carried out. Therefore, it is possible to construct a very flexible tree structure.

Moreover, plural difference tree description tables can be provided with respect to the same table-format data. Therefore, it is possible to construct plural tree structures for the same data.

In a preferred embodiment, the step e) includes:

a step of generating, in the information block on the master side, a second projection array for indicating the pointer array of the information block along with addition of the entry value when equalizing the value list;

a step of generating, in the information block on the slave side, a third projection array that sums up the number of values of entries that are made common; and a step of generating, in the information block on the slave side, a fourth projection array, which is a set of values indicating records sorted by the entries that are made common;

wherein the second projection array, the pointer array of the information block on the master side, the third projection array and the fourth projection array are sequentially traced to specify a record on the slave side.

In a more preferred embodiment, the method further includes n) a step of generating a reverse mapping array of the second projection array related to the master side, except for the table-format data having the smallest depth, wherein an element of the reverse mapping array indicated by an element from the fourth projection array specifies an element of the second projection array on the master side in the table-format data having the second smallest depth.

Moreover, it is preferred that the step of generating a reverse mapping includes:

a step of arranging an array for reverse mapping containing the same number of elements as the elements of the second projection array related to the master side;

a step of arranging another value that cannot specify a record, as each of the elements; and a step of providing a value to the reverse mapping array, using a position of the fourth projection array as an element and regarding an element as a position.

In another preferred embodiment, the method further includes a step of performing one of search, totaling and sorting with respect to the entry that should be made common of the table-format data, of at least one of the two table-format data in which the entry should be made common.

According to the above-described embodiment, it is possible to construct a tree structure using table-format data on which search, totaling, sorting or the like has been performed.

In this manner, according to this invention, it is possible to select an arbitrary root and create a desired tree structure. It is also possible to use data on which search, totaling or sorting has been performed, as data to be a base for creating a tree structure.

The object of this invention is also achieved by a program for connecting plural table-format data, each being expressed as a record array containing an entry and an entry value included in the entry, and converting the connected table-format data as join tables to a tree structure, the program characterized by causing the computer to execute:

a) a step of dividing each table-format data into one or more information blocks, each containing a value list in which entry values belonging to specified entries are stored in order of entry value numbers corresponding to the entry values and a pointer array in which pointer values for indicating the entry value numbers are stored in univocal order of record numbers;

b) a step of selecting two table-format data in which an entry should be made common;

c) a step of finding an entry that should be made common in the selected two table-format data;

d) a step of determining table-format data on which default sorting order is reflected, as master table-format data, of the specified information blocks, and determining the other table-format data as slave table-format data;

e) a step of associating a record the master side with a corresponding record on the slave side in the selected table-format data in the case where the value lists contained in the specified information blocks are equalized with each other;

f) a step of selecting two other table-format data that regard the table-format data on the slave side of the former two table-format data, as the master side, and executing the step c) of finding an entry, the step d) of determining master table-format data and slave table-format data, and the step e) of associating, with respect to the other two table-format data;

g) a step of repeating the step f) with respect to table-format data that need to be joined;

h) a step of selecting table-format data to be a root from the table-format data connected by joining, and determining depth of each table-format data in accordance with the connection of the table-format data;

i) a step of securing an area for a tree description table having a combination of the depth and a record number, as a value;

j) a step of specifying a record having certain depth that is initially the smallest depth, and arranging a value indicating the record together with the depth into the area for the tree description table;

k) a step of specifying a record of the table-format data on the slave side from the specified record, and arranging, on the basis of the record, a value indicating a record of table-format data that regards the table-format data on the slave side as the master side, together with the depth of the table-format data on the master side, into the area for the tree description table;

l) a step of repeating the step k) until depth where no table format data exist is reached or until no record exists any longer; and m) a step of repeating the steps j) to l) to arrange a value specifying predetermined depth and record into the area for the tree description table, and thus completing the tree description table.

BRIEF DESCRIPTION OF THE DRAWINGS

The object and other advantages of this invention will be further clarified by referring to embodiments together with the attached drawings, wherein:

FIG. 10 is a view showing an example of tree description table according to this embodiment;

FIG. 11 is a view for explaining processing to arrange values in the tree description table according to the first embodiment;

FIG. 13 is a view for explaining processing to arrange values in the tree description table according to the first embodiment;

FIG. 15 is a view for explaining processing to arrange values in the tree description table according to the first embodiment;

FIG. 17 is a view for explaining processing to arrange values in the tree description table according to the first embodiment;

FIG. 18 is a view for explaining processing to arrange values in the tree description table according to the first embodiment;

FIG. 19 is a view for explaining processing to arrange values in the tree description table according to the first embodiment;

FIG. 21 is a view showing another example of table-format data and an example of information block based on the table-format data;

FIG. 23 is a view showing another example of table-format data and examples of information blocks based on the table-format data;

FIG. 27 is a view showing a tree description table according to the second embodiment;

FIG. 28 is a view for explaining processing to arrange values in the tree description table according to the second embodiment;

FIG. 30 is a view for explaining processing to arrange values in the tree description table according to the second embodiment;

FIG. 32 is a view for explaining processing to arrange values in the tree description table according to the second embodiment;

DESCRIPTION OF PREFERRED
EMBODIMENTS OF THE INVENTION

Figure 1:
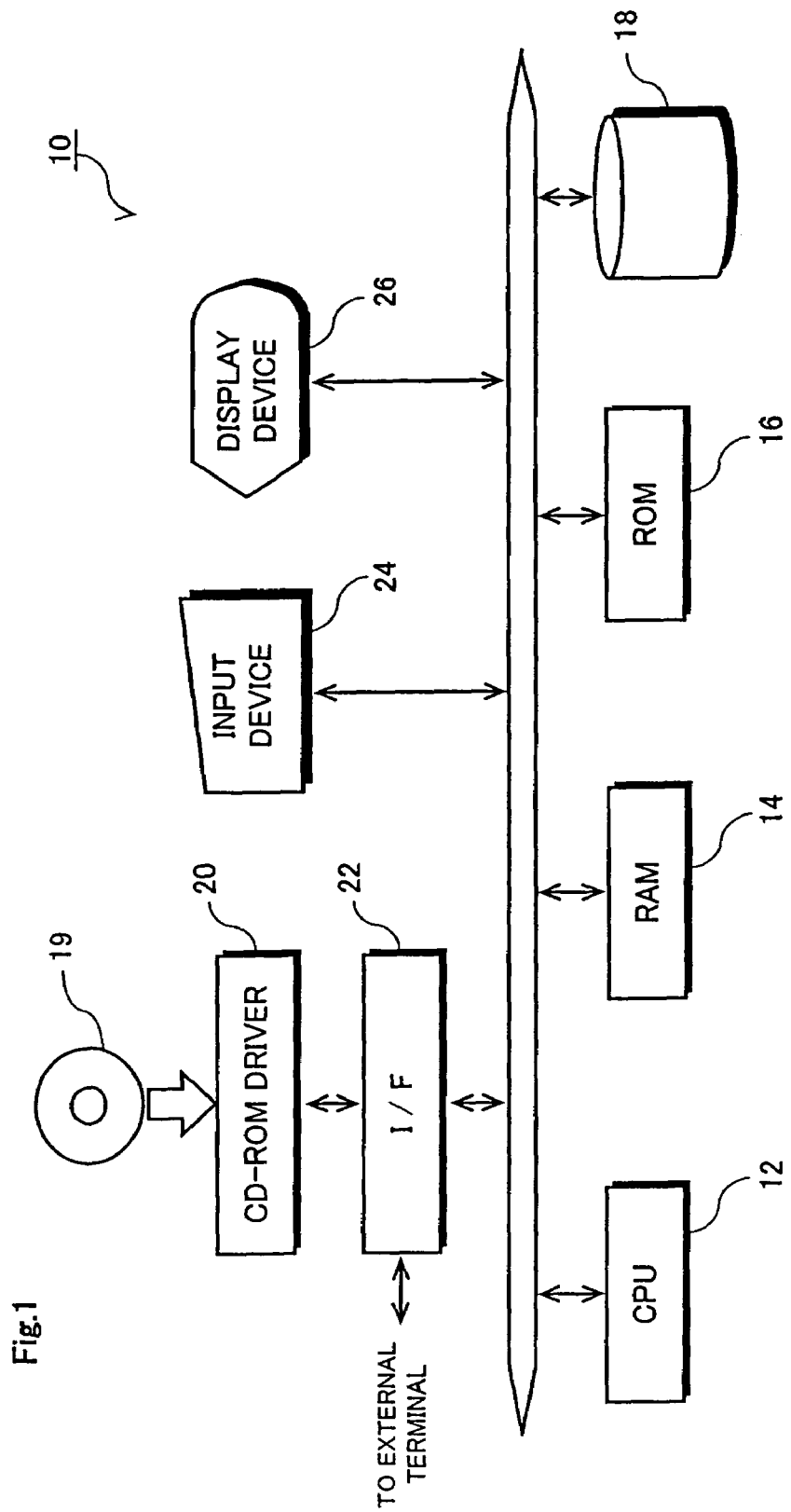
FIG. 1 is a block diagram showing the hardware structure of a computer system that can realize a method of constructing a tree structure according to an embodiment of this invention.

Hereinafter, embodiments of this invention will be described with reference to the attached drawings. FIG. 1 is a block diagram showing the hardware structure of a computer system that joins chained table-format data and converts the join tables to a tree structure according an embodiment of this invention. As shown in FIG. 1, this computer system 10 has a structure similar to an ordinary computer system and includes a CPU 12 that executes a program to control the entire system and individual constituent parts, a RAM (random access memory) 14 that stores work data and the like, a ROM (read-only memory) 16 that stores programs and the like, a fixed storage medium 18 such as hard disk, a CD-ROM driver 20 for accessing a CD-ROM 19, an interface (I/F) 22 provided between the computer system and the CD-ROM driver 20 or an external terminal connected with an external network (not shown), an input device 24 including a keyboard and mouse, and a CRT display device 26. The CPU 12, RAM 14, ROM 16, external storage medium 18, I/F 22, input device 24 and display device 26 are connected with each other via a bus 28.

A program for connecting (joining) table-format data in a chained manner, a program for converting connected tables (join tables) to a tree structure, and the like may be contained in the CD-ROM 19 and read out by the CD-ROM driver 20, or may be stored in the ROM 16 in advance. Also, the programs read out from the CD-ROM 19 may be stored into a predetermined area in the external storage medium 18. Alternatively, the programs may be supplied from outside via a network (not shown), the external terminal and the I/F 22.

In this embodiment, in order to realize high-speed conversion to a tree structure, information blocks of a predetermined data format must be generated as will be described later. A program for generating the information blocks may be similarly contained in the CD-ROM 19, stored in the ROM 16, or stored in the external storage medium 18. Alternatively, it is a matter of course that the program may be supplied from outside via the network (not shown). In this embodiment, the data (information blocks) generated by the information block generating program are stored in the RAM 14 or stored into a predetermined area in the external storage medium 18.

Figure 2:
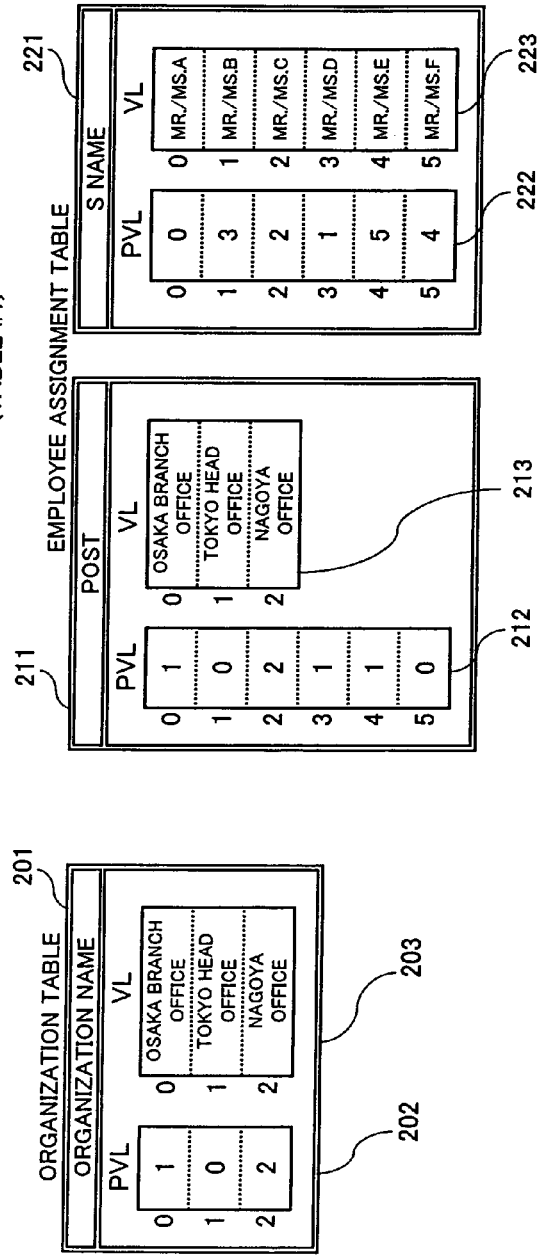
FIG. 2 is a view showing examples of table-format data and examples of information blocks based on the table-format data.
Figure 3:
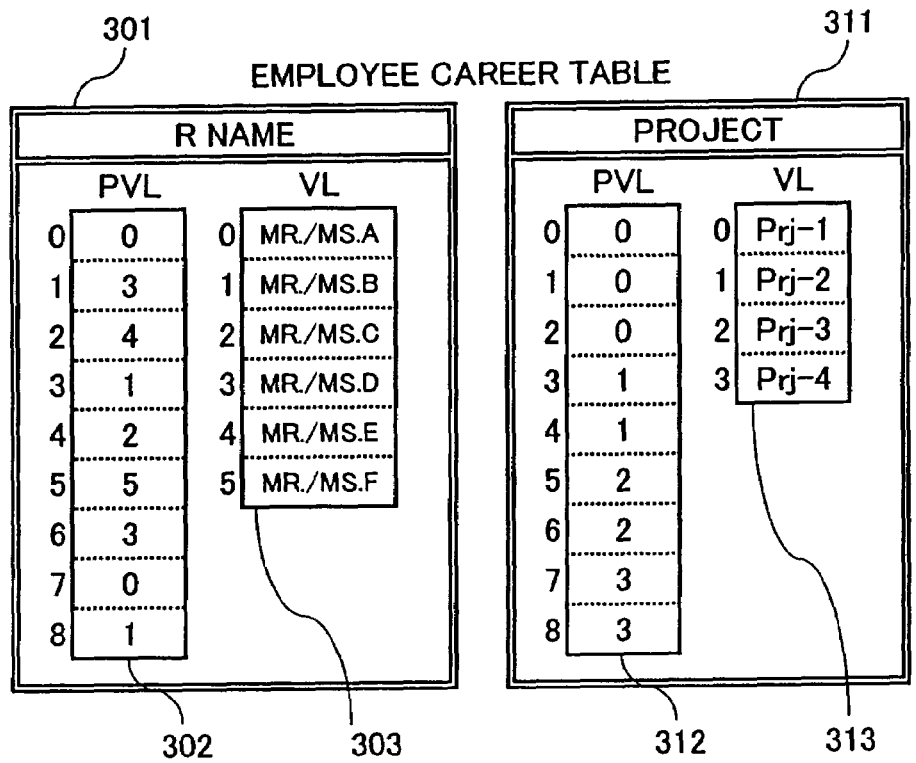
FIG. 3 is a view showing an example of table-format data and examples of information blocks based on the table-format data.

In this embodiment, as shown in FIGS. 2 and 3, table-format data (tables) are held in a predetermined data format. For example, an organization table with table #0 is made up of an information block 201 having a value list (hereinafter referred to "VL" in suitable cases) 203 in which "organization names", which are actual entry values, are sorted and arranged in order of the Japanese syllabary (in English, alphabetic order), and a pointer array (hereinafter referred to "PVL" in suitable cases) 202 to the value list, in which numbers in the value list indicating individual record numbers are stored corresponding to the individual record numbers, as shown in FIG. 2(a). An element (entry value) in the VL, of a number indicated by an element in the PVL 202 corresponding to a record number, is the entry value corresponding the record. It can be understood that The PVL 202 contains the same number of elements as the number of records in the table.

FIG. 2(b) shows an employee assignment table containing values (entry values) in an entry of "post" and values (entry values) in an entry of "S name". The employee assignment table is made up of an information block 211 and an information block 221. The information block 211 of "posts" contains a VL 213 in which "post names" are stored and stored (and which has common elements shared by the VL of "organization name"), and a PVL 212 for indicating the elements (post names in the VL 213. The information block 211 of "S name" contains a VL 223 in which names of employees are sorted and stored, and a PVL 222 for indicating the elements (names) in the VL 223.

Similarly, an employee career table is made up of an information block 301 containing values in an entry of "R name", and an information block 311 containing values in an entry of "project", as shown in FIG. 3. Also in the example of FIG. 3, each information block contains a PVL (see 302, 312) and a VL (see 303, 313), as in the examples shown in FIG. 2(a) and FIG. 2(b).

Here, referring to the organization table and the employee assignment table, it can be understood that the "organization names" in the organization table and the "posts" in the employee assignment table can be shared. Also, referring to the employee assignment table and the employee career table, it can be understood that the "S names" in the employs assignment table and the "R names" in the employee career table can be shared. In this embodiment, join tables in which entries are shared are generated in a chained manner, thus expressing a tree structure. Hereinafter, conversion processing to a tree structure will be described more in detail.

Figure 4:
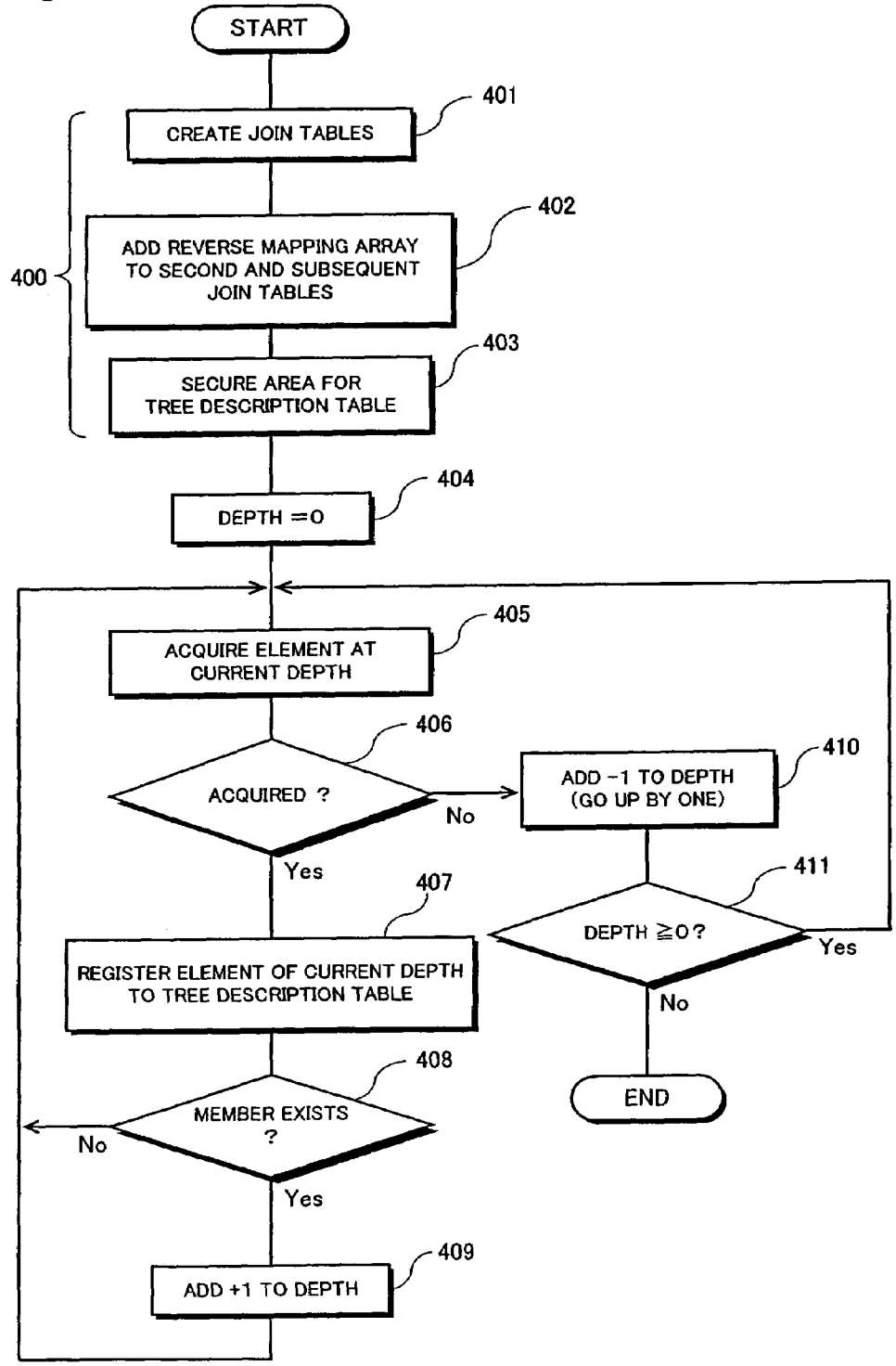
FIG. 4 is a flowchart showing conversion processing to a tree structure according to this embodiment.

FIG. 4 is a flowchart is a flowchart showing conversion processing to a tree structure according to this embodiment. In FIG. 4, creation of a join table (step 401), addition of a reverse mapping array to the second and subsequent join tables (step 402), and securing of an area for a tree description table (step 403) constitute preparatory steps of the processing. First, these steps will be described in detail.

In the examples shown in FIGS. 2 and 3, the three tables exist, that is, the organization table, the employee assignment table, and the employee career table. Here, joining (join #0) of the organization table and the employee assignment table is executed using the "organization name" ("post") as a key. Then, table sharing processing is carried out, and joining (join #1) of the employee assignment table and the employee career table is executed using the "S name" ("R name") as a key.

Figure 5:
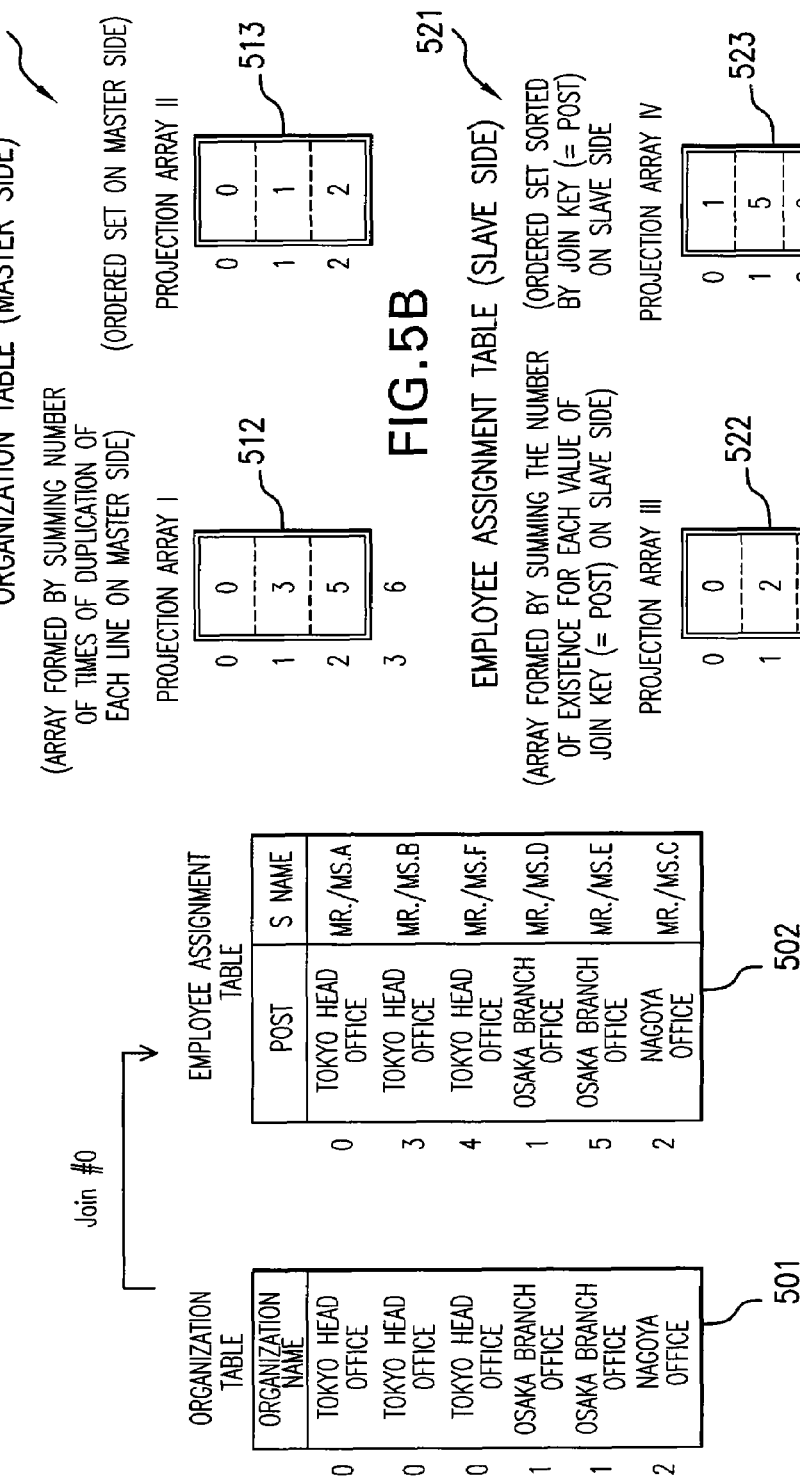
FIG. 5 is a view for explaining joining of an organization table and an employee assignment table.

FIG. 5 is a view for explaining joining of the organization table and the employee assignment table. In this case, the organization table (see 501) and the employee assignment table (see 502) are joined with each other in the state where the order of the entry values in the organization table is maintained.

Referring to FIG. 4, first, a join table based on the organization table and the employee assignment table is generated. In FIG. 5(a), since the order of the entry values in the organization table is maintained, the organization is referred to as "master side" and the employee assignment table is referred to as "slave side". In this example, the organization table 501 and the table 502 of "post" in the employee assignment table are joined to form a join table (join #0).

As shown in FIG. 5(b), with respect to the master side (see 511), an array (also referred to as projection array "i") 512 formed by summing up the number of times of duplication of each line (record) on the master side, and an ordered set 513 on the master side (also referred to as projection array "ii") are generated.

In the projection array "i", the number (total number) of repetitions of the line numbers in the original organization table (see FIG. 2(a)) is shown. For example, since the element in the first line (line number "0") is "0" and the element in the second line (line number "1") is "3", it can be understood that the number of time of duplication of the entry value of "Tokyo head office" situated in the line of line number "0" in the original organization table is "3−0=3". Also, in the projection array "i", since the element in the second line (line number "1") is "3" and the element in the third line (line number "2") is "5", it can be understood that the number of times of duplication of the entry value of "Osaka branch office" corresponding to line number "1" in the original organization table is "5−3=2". At the end (bottom line) of the projection array "i", the total number of lines of the joined tables is arranged (in the joined organization table, "6" is arranged).

In the projection array "ii", the line numbers in the original organization tables that designate line numbers in the joined organization table (that is made common) are shown. That is, this projection array "ii" is used for designating line numbers in the new organization table when an entry is added by making the organization table common. By referring to the projection array "i" 512 and the projection array "ii" 513, it is possible to specify values arranged in the joined organization table. For example, with respect to three lines of line numbers "0" to "2" related to the joined organization table (join #0), the element corresponding to line number "0" in the projection array "ii" is "0". Therefore, it can be understood that the element corresponding to line number "0" in the original organization table, that is, "Tokyo head office", is arranged in the joined organization table.

Next, on the slave side (521), for each value of the entry used as a key for the joining (join #0), that is, for each value of "post", an array (also referred to as projection array "iii") 522 formed by summing up the number of times of duplication of each line in the join table, and an ordered set (also referred to as projection array "iv") 523 sorted by the entry used as a key for the joining on the slave side, are generated.

On the slave side, since the sorting has been performed by the entry "post" used as a key for the joining (join #0), the projection array "iii" is formed as indicated by numeral 522. In the projection array "iii", according to the sorting order, the number of times of duplication of the entry value "Osaka branch office", in the entry of "post", is "2−0=2". The number of times of duplication of the entry value "Tokyo head office" is "5−2=3". The number of times of duplication of the entry value "Nagoya office" is "6−5=1".

The values in the projection array "iv" represent the line numbers in the original employee assignment table. By referring to the projection table "iii" and the projection table "iv", it is possible to realize correspondence between the elements in the joined table and the elements in the original employee assignment table. For example, with reference to the elements in the lines of line numbers "0" and "1" in the projection array "iii", it can be understood that two elements exist with respect to the first element "Osaka branch office" in the sorted entry of "post" and correspond to line numbers "1" and "5" in the original employee assignment table.

In this manner, when the joining (join #0) of the organization table and the employee assignment table using the entry of "organization name" and the entry of "post" is completed, joining (join #1) of the employee assignment table and the employee career table is executed by using the entry of "S name" and the entry of "R name" as keys.

Figure 6:
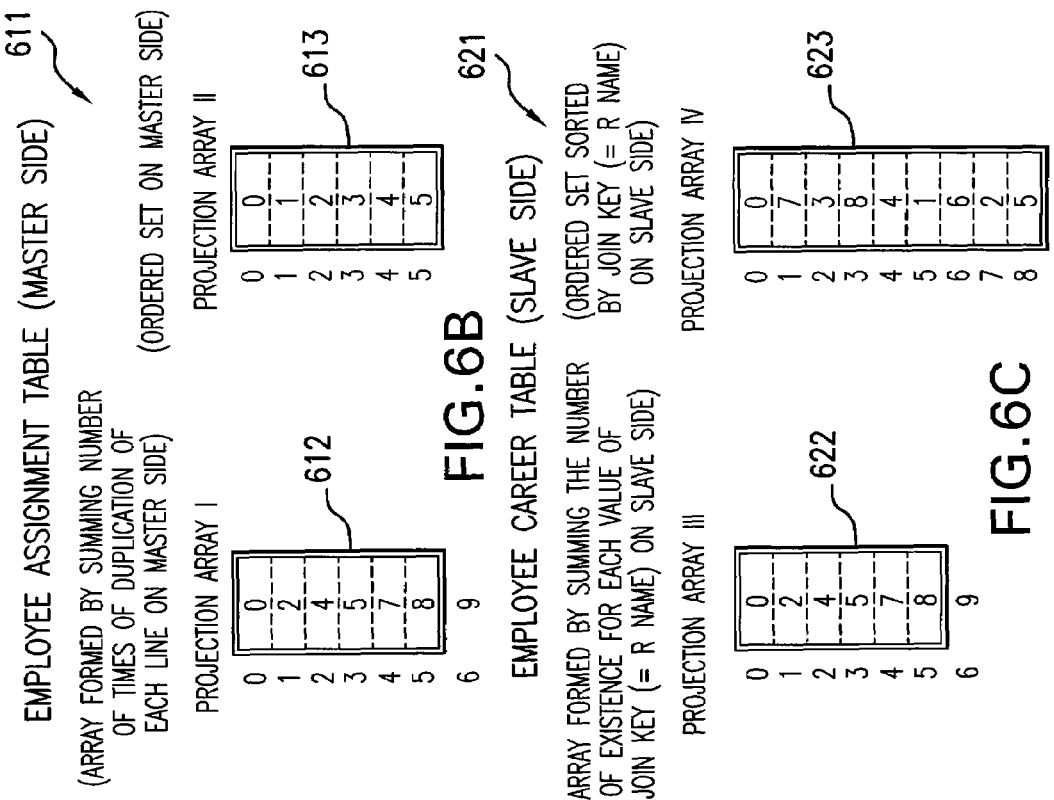
FIG. 6 is a view for explaining joining of an employee assignment table and an employee career table according to this embodiment.

FIG. 6 is a view for explaining the joining of the employee assignment table and the employee career table. In this joining, the order of the values of "S name" in the employee assignment table is maintained, as in the above-described joining (join #0). Therefore, the employee assignment table becomes the master side and the employee career table becomes the slave side. In FIG. 6(*a*), a table 601 of "S name" in the employee assignment table and a table 602 of "R name" in the employee career table are joined to form a join table (join #1).

FIG. 6(*b*) shows an array (projection array "i") 612 formed by summing up the number of times of duplication of each line (record) and an ordered set (projection array "ii") 613, with respect to the master side 611 in this joining (join #1). FIG. 6(*c*) shows an array (projection array "iii") 622 formed by summing up the number of times of duplication of each line in the join table, for each value of the entry "R name" used as a key for the joining (join #1), and an ordered set (projection array "iv") 623 sorted by the entry used as a key for the joining, with respect to the slave side 612 in the joining (join #1). The generation of these arrays is similarly performed as in the joining (join #0) shown in FIG. 5.

In the ordered set (projection array "iv") 523 on the slave side in the first joining (join #0) and the ordered set (projection array "ii") 613 on the master side in the second joining (join #1), the same values designate the same records. This is because the table (employee assignment table) containing the same values (elements) as subjects is used.

Figure 7:
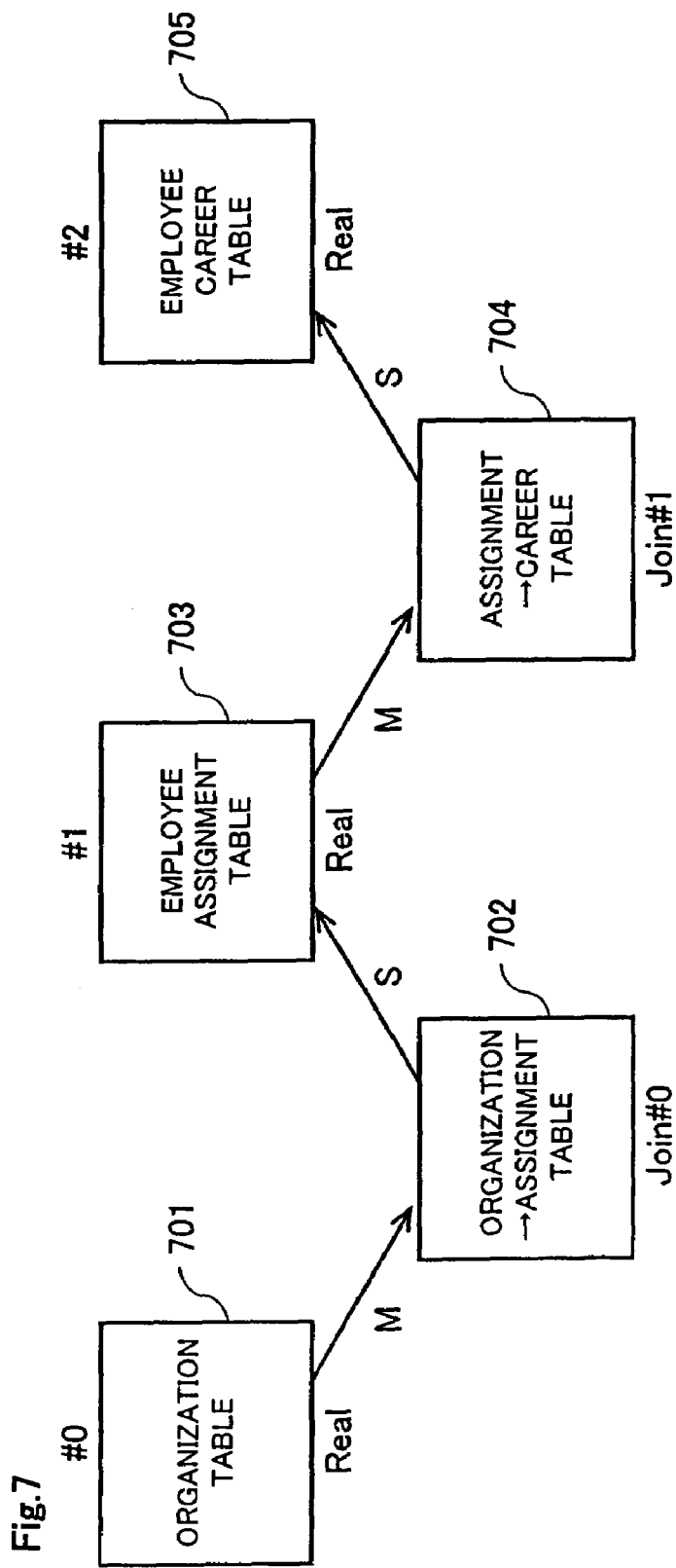
FIG. 7 is a view showing an example of chaining of join tables according to this embodiment.

In this manner, by the join table creation processing (step 401 in FIG. 4), a join table (organization/assignment table (join #0)) 702 mediating between an organization table 701 and an employee assignment table 703 as shown in FIG. 7 is created, and a join table (assignment/career table (join #1)) 704 mediating between the employee assignment table 703 and an employee career table 705 is created. Moreover, it is a matter of course that if there is a table to be joined with the employee career table, another join table (join #2) mediating between these tables may be created.

As the creation of the join tables is completed, a reverse mapping array is generated and added with respect to the other join tables than the first join table, that is, the second and subsequent join tables (step 402). The reverse mapping array designates numbers indicating the original array, by the values in the reverse mapping array.

Figure 8:
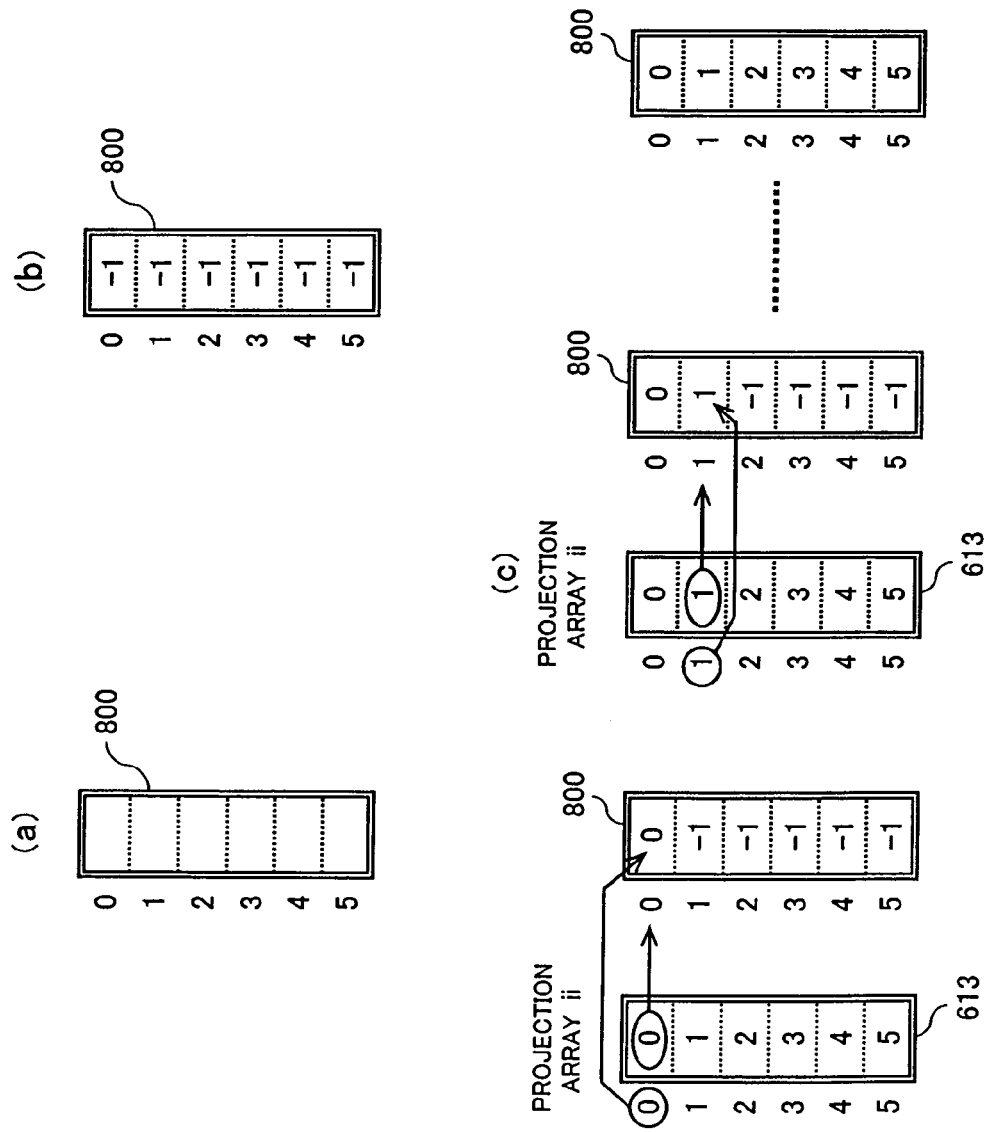
FIG. 8 is a view for explaining generation of a reverse mapping array according to this embodiment.

As shown in FIG. 8, to create the reverse mapping array, an area 800 of an array having the same number of records as the original array (mapping array "ii") used for reverse mapping is secured (see FIG. 8(*a*)), and a value (for example, "−1") that cannot be a number indicating a record is provided as the element in the array (see FIG. 8(*b*)). Then, the number in the original array (record number) is arranged at the element indicated by the value in the original array (projection array "ii" 613) (see FIG. 8(*c*)). In this manner, it is possible to provide the ultimate mapping array 800 as shown at the right end in FIG. 8(*c*).

Next, an area for a tree description structure is secured (step 403). FIG. 10 is a view showing an example of tree description structure. The tree description structure is made up of a combination of plural depths and record numbers (Rec No). No value is initially provided in each entry and values are sequentially provided by the processing that will be described later. The "depth" represents the depth of a tree node. In the example shown in FIG. 7, the depths of "organization table", "employee assignment table" and "employee career table" are "0 (zero)", "1" and "2", respectively.

Figure 9:
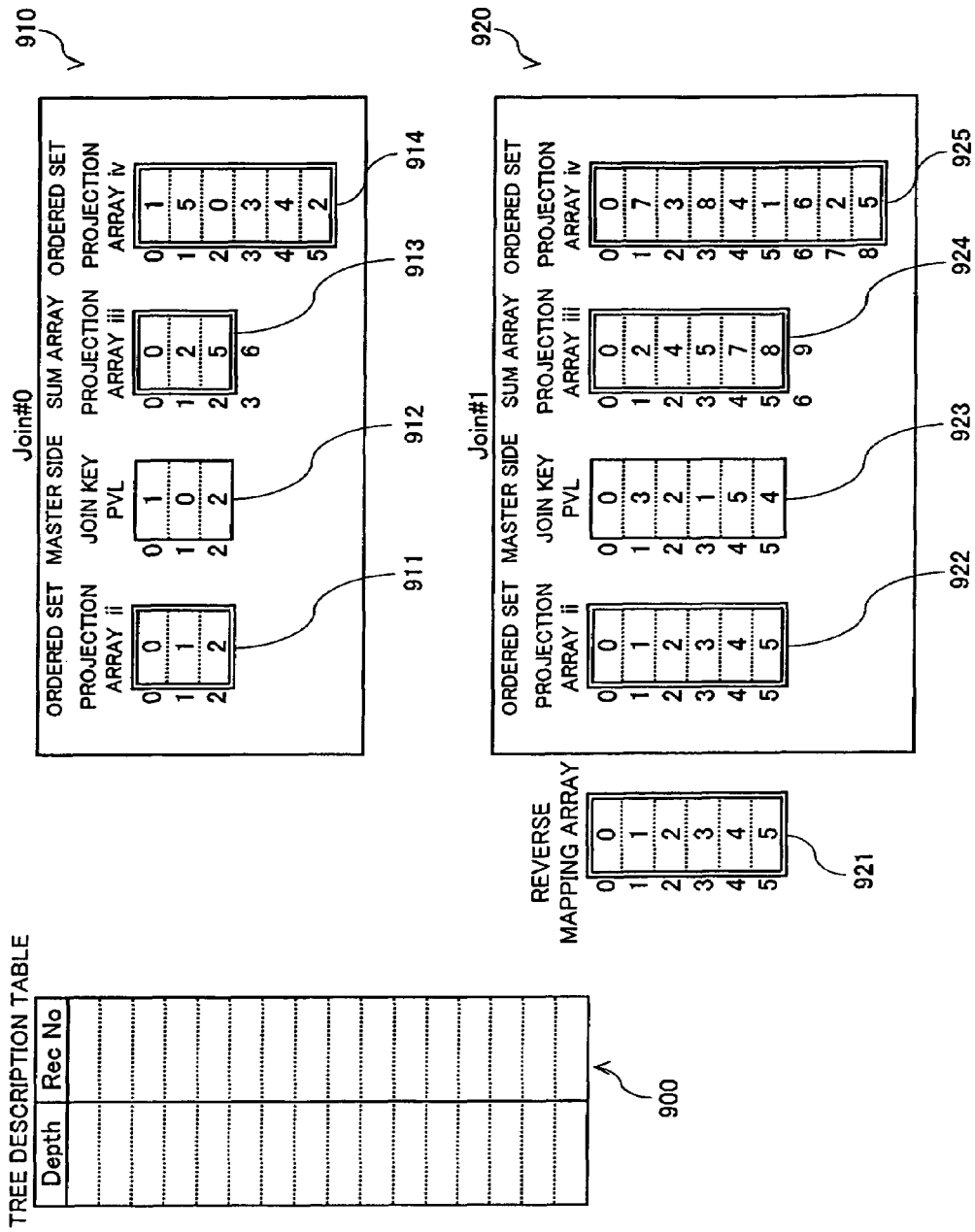
FIG. 9 is a view showing various arrays used for generating a tree description table according to this embodiment.

In this embodiment, to create a tree description table that describes a tree structure, the secured area for the tree description table, a first array group 910 related to the first joining (join #0), that is, related to the joining of the organization table and the employee assignment table, a second array group 920 related to the second joining (join #1), that is, related to the joining of the employee assignment table and the employee career table, and a reverse mapping array 921 associating these array groups with each other are used, as shown in FIG. 9.

The first array group 910 contains an ordered set (projection array "ii") 911, a join key PVL 912, a sum array (projection array "iii") 913 and an ordered set (projection array "iv") 914 with respect to the first joining (join #0). Similarly, the second array group 920 contains an ordered set (projection array "ii") 922, a join key PVL 923, a sum array (projection array "iii") 924 and an ordered set (projection array "iv") 925 with respect to the second joining (join #1).

First, the depth is initialized to "0 (zero)" (step 404) and then an element at the current depth is acquired (step 405). When the element is acquired ("Yes" at step 406), the element at the current depth is registered together with the depth to the tree description table (step 407). In the above-described example, an element in the "organization table" is acquired. In FIG. 11, the element at the beginning (line number "0") of the ordered set (projection array "ii") is arranged together with its depth "0", as the first element in the tree description table (see 1000).

Figure 12:
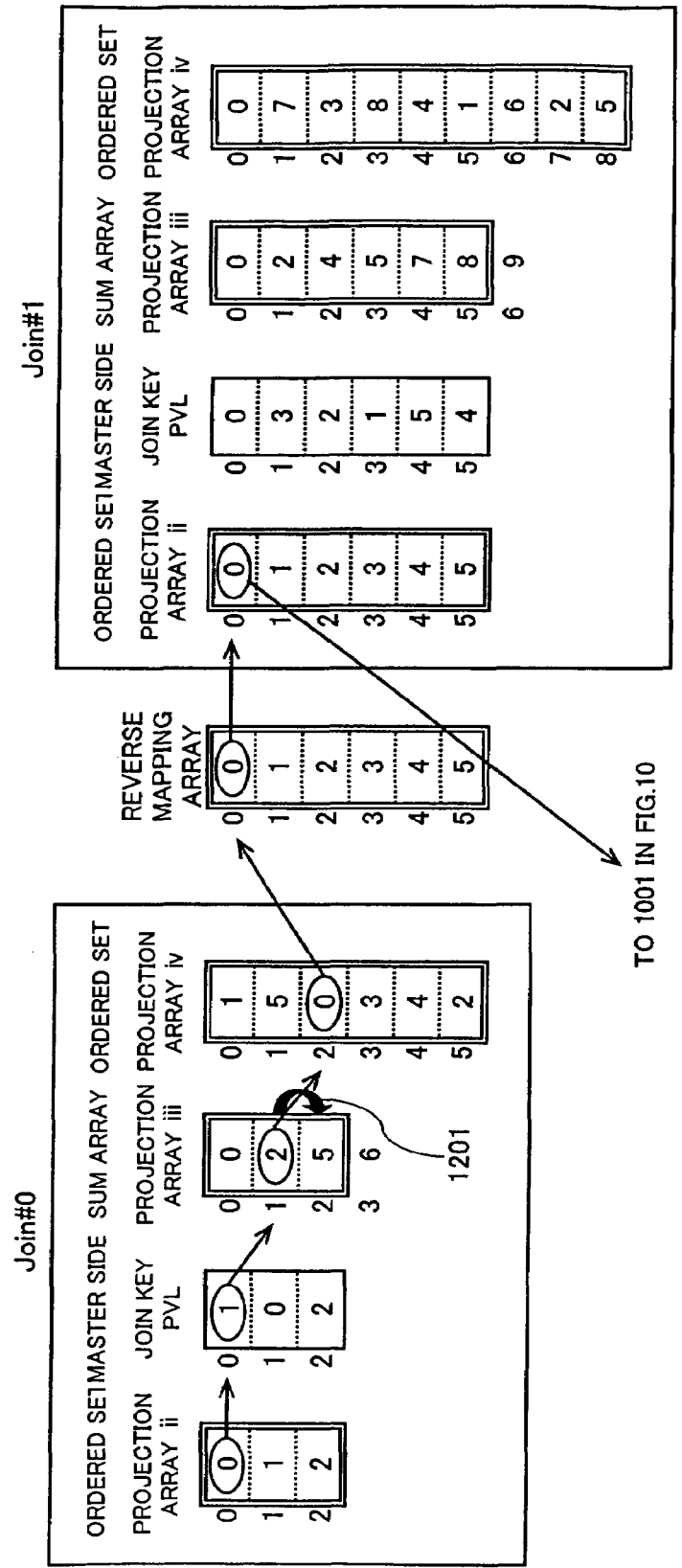
FIG. 12 is a view for explaining processing to arrange values in the tree description table according to the first embodiment.

Next, it is judged whether a "member" exists or not (step 408). Here, a "member" refers to a corresponding element in the ordered set (projection array "ii") in a table at the next depth (for example, table at the depth "1") reached by tracing the array from the ordered set (projection array "ii") in a table at a certain depth (for example, table at the depth "0" (organization table). In the example of FIG. 11, at the element "0" having line number "0" in the ordered set (projection array "ii"), the existence of a member element can be learned by sequentially tracing the PVL, sum array (projection array "iii") and ordered set (projection array "iv") in the table (organization table) at the depth "0", the reverse mapping array, and the ordered set (projection array "ii") in the table (employee assignment table) at the depth "1", as shown in FIG. 12. Therefore, the result of the judgment at step 408 is "Yes".

In this case, the depth is incremented (step 409). An element at this depth (in the above-described example, depth "1") is acquired and the acquired element is arranged together with the depth (in the above-described example, "1") as the next element in the tree description table. Both the element in the projection array "iv" in the first joining (join #0) and the element in the projection array "ii" in the next joining (join #1) represent the records in the same table. Therefore, it should be noted that if these elements are the same, they represent the same record.

In FIG. 12, it can be understood that three elements exist from the element "2" of line number "1" and the element "5" of the next line number "2" in the sum array (projection array "iii") in the table (organization table) at the depth "0" (see 1201). In short, it can be understood that, at this depth "0", the element of line number "1" in the sum array indicates three line numbers "2", "3" and "4" in the ordered set (projection array "iv") that is arranged next to sum array. In FIG. 12 and the subsequent drawings, an arrow attached to the right side of the sum array (projection array "iii") means that, by the number equal to the difference between the element situated at the destination of the arrow and the element situated at the originating part of the arrow, elements exist in the ordered set (projection array "iv) that can indicate the element situated the originating part of the arrow.

Next, the depth is further incremented (step 409) and an element at the next depth is acquired (step 405). With respect to the example of FIG. 12, the depth is incremented to "2" and the ordered set (projection array "ii"), PVL, sum array (projection array "iii") and ordered set (projection array "iv") in the table at the depth "1" are traced. As shown in FIG. 13, as the element of line number "0" in the ordered set (projection array "ii") is traced, the elements "0" and "7" of line numbers "0" and "1" in the ordered set (projection array "iv") are ultimately taken out. This is because the associated element in the sum array (projection array "iii") is "0" and the element of the next line number is "2" and hence it can be understood that "2−0=2" elements exist. Therefore, the elements "0" and "7" of line numbers "0" and "1" in the ordered set (projection array "iv") are arranged together with the depth "2", as elements in the tree description table (see 1002 and 1003).

Since there is no further depth (depth "3"), the search in the direction of depth ends. In short, the result of the judgment at the next step 406 is "No" in the loop of steps 405 to 409, and the depth is decremented (step 410). That is, the depth is reduced by one and if this depth is equal to or more than "0", the processing continues (see step 411).

Figure 14:
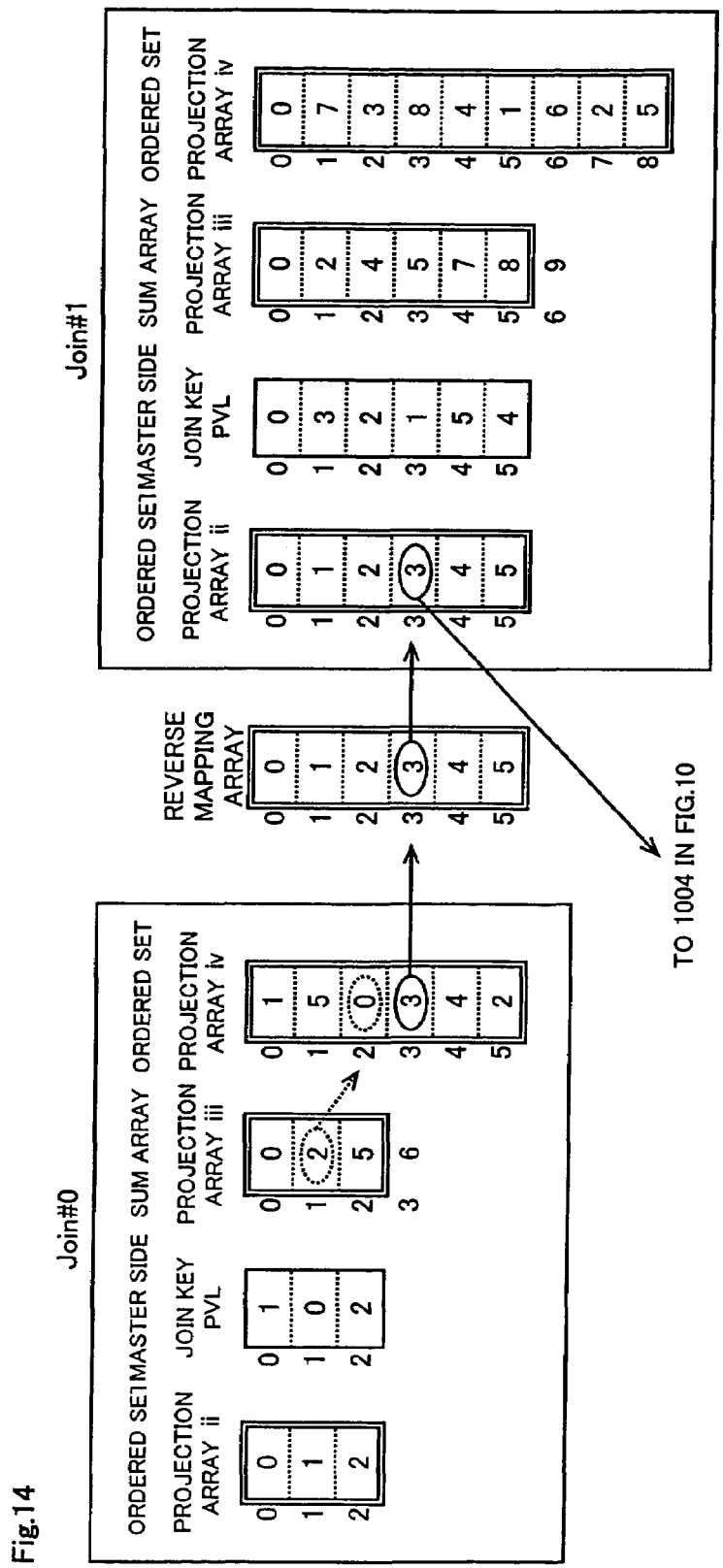
FIG. 14 is a view for explaining processing to arrange values in the tree description table according to the first embodiment.

In the above-described example, since the depth is changed from "2" to "1", the element at the depth "1" is acquired again. As described with reference to 1201 in FIG. 12, it is known that three elements exist with respect to the sum array (projection array "iii") at the depth "1". Of these elements, the second and third elements have not been processed. Therefore, at the next step 405, processing is executed on the basis of the second element. As shown in FIG. 14, from the second element (element of line number "3" situated next to line number "2") in the ordered set (projection array "iv"), the reverse mapping array and the next ordered set (projection array "ii" are traced and a corresponding element is acquired. This is arranged together with the depth "1", as an element in the tree description table (see 1004).

Moreover, the depth is incremented (see step 409) and processing to acquire an element at the depth "2" is executed.

As shown in FIG. 15, an element at the depth "2" is acquired by tracing the ordered set (projection array "ii"), PVL, sum array (projection array "iii") and ordered set (projection array "iv"). As can be understood from the arrow arranged at the sum array, two elements are acquired in this case. The acquired elements are arranged together with the depth "2", as elements in the tree description table (see 1005 and 1006). Since there is no depth "3", the search in the direction of depth ends.

Figure 16:
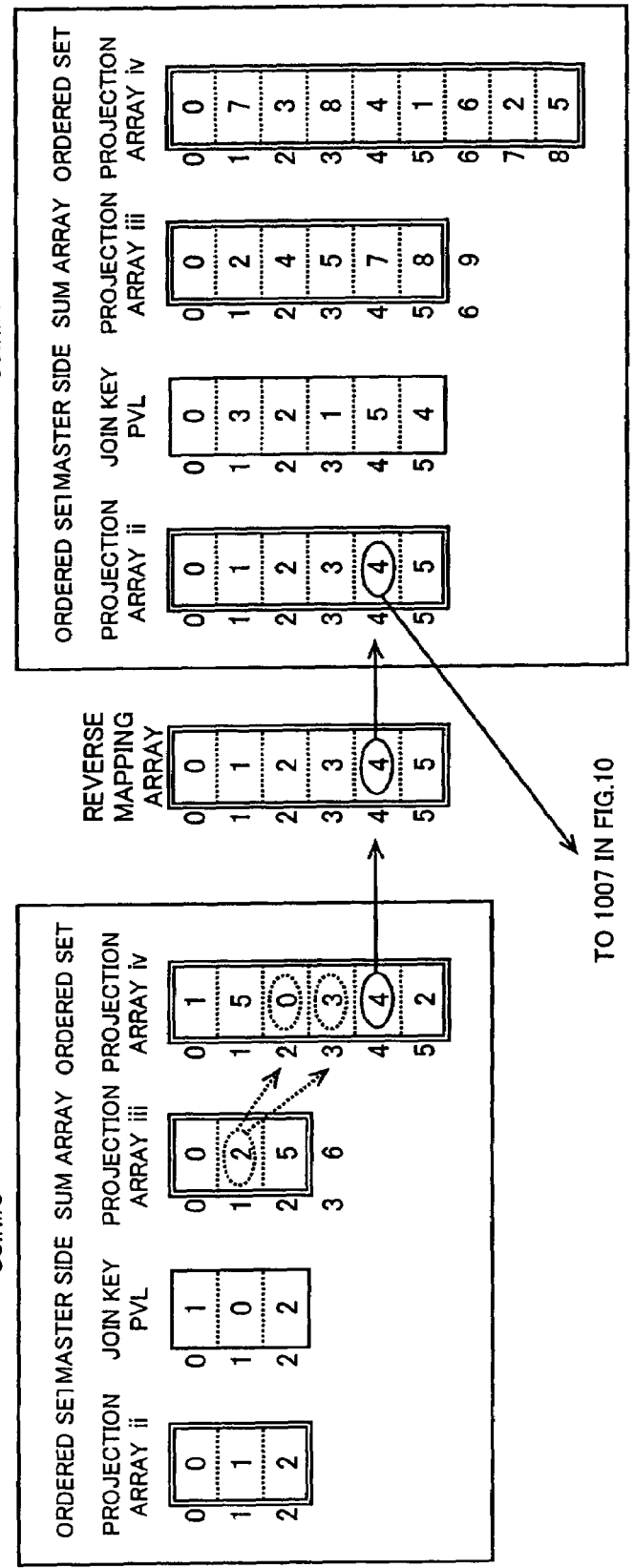
FIG. 16 is a view for explaining processing to arrange values in the tree description table according to the first embodiment.
Figure 17:
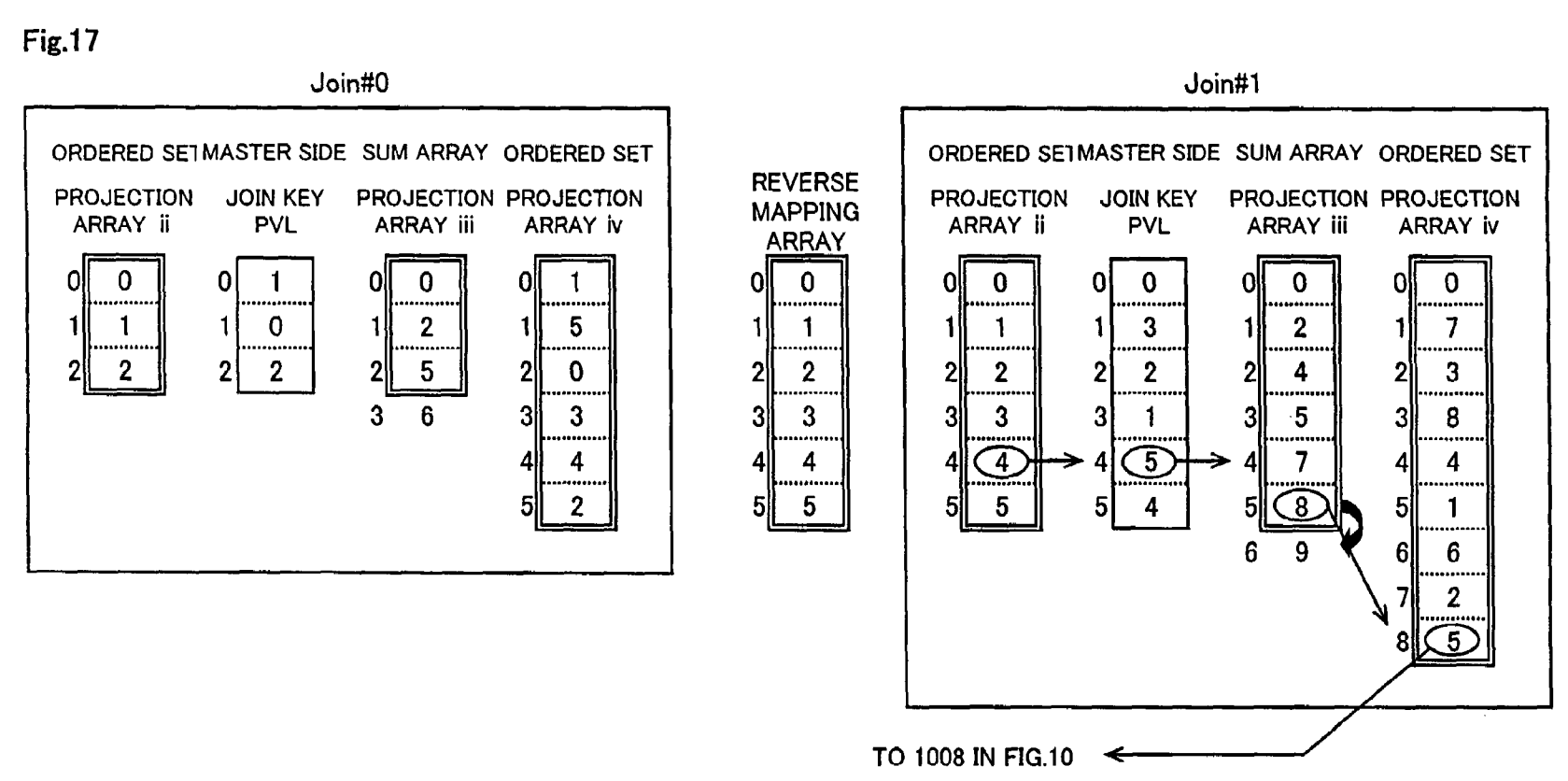

Similarly, as shown in FIG. 16, by tracing the reverse mapping and the ordered set (projection array "ii") from the third element at the depth "1" (element of line number "4" in the ordered array (projection array "iv"), an element at the depth "1" can be acquired. This, too, is arranged together with the depth "1" in the tree description table (see 1007). Moreover, as shown in FIG. 17, an element at the depth "2" is acquired by tracing the arrays and is arranged together with the depth "2" in the tree description table (see 1008). Again, since there is no depth "3", the search in the direction of depth ends.

After such end, no element can be acquired even if the depth is decremented to "1" (steps 410, 411, 415 and 406). Therefore, the depth is further decremented to "0" and an element at the depth "0" is acquired. As shown in FIG. 18, the next element "1" (that is, line number "1") in the ordered set (projection array "ii") becomes an element to be registered to the tree description table. Therefore, this element is arranged together with the depth "0" in the tree description table (see 1009). After that, as described with reference to FIGS. 4 and 11 to 18, the sequential search in the direction of depth and the arrangement of elements in the tree description table are repeated.

FIG. 19 is a view showing a state where an ultimate element in the tree description table is acquired as a result of continuing the processing as described above. The processing described here is executed after the element at the depth "1" is arranged in the tree description table in the previous processing, not shown. The element arranged in the tree description table has a common meaning with the ordered set (projection array "ii") on the side of "joint #1" related to the depth "1". Therefore, as this element is traced, an element at the depth "2" can be searched for.

In the example of FIG. 19, the PVL and the sum array (projection array "iii") are traced from the element "2" of line number "2" in the ordered set (projection array "ii"), and the element "4" of line number "4" in the ordered set (projection array "iv") is acquired. This element is arranged together with the depth "2" in the tree description table.

Figure 20:
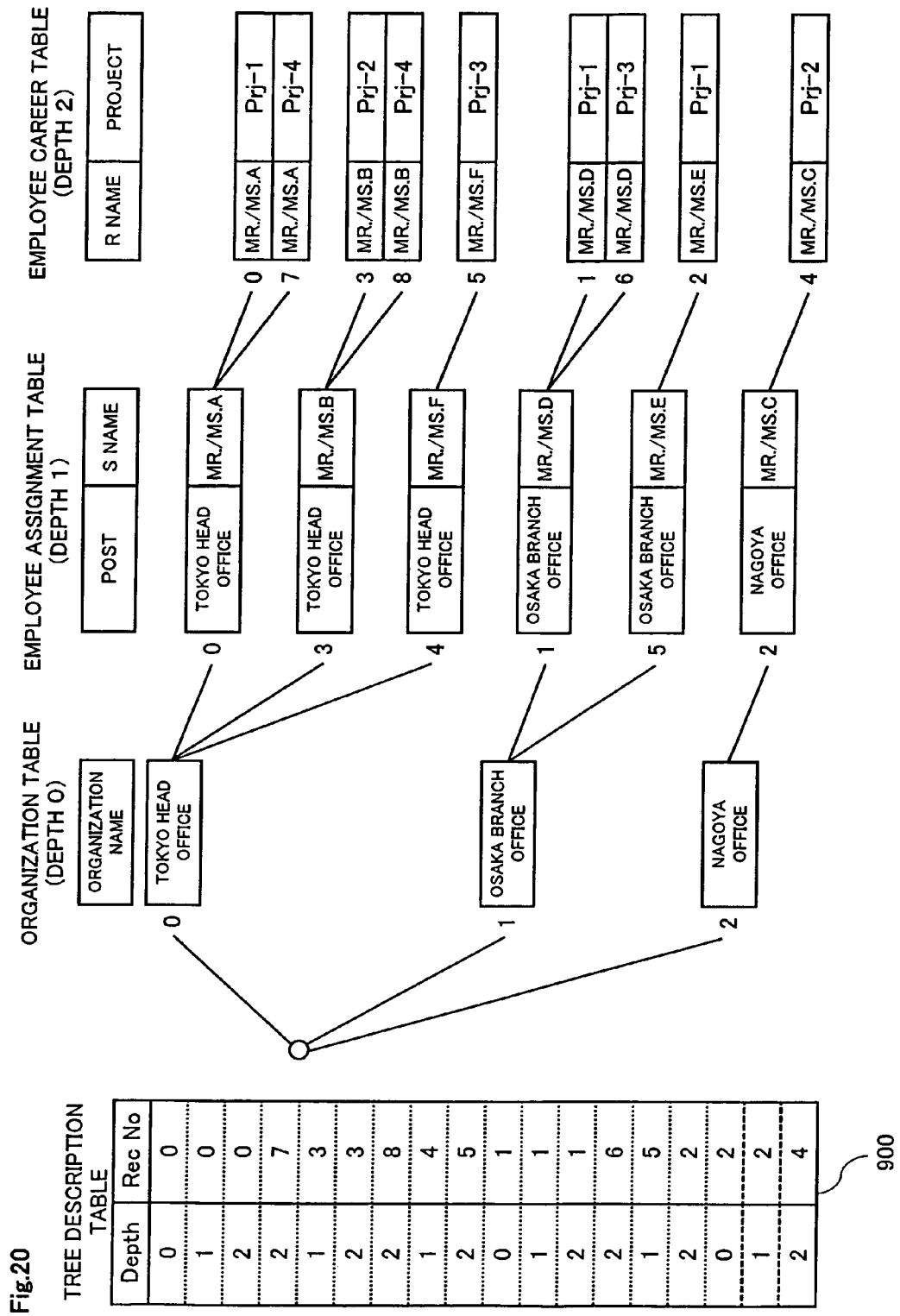
FIG. 20 is a view for explaining processing to arrange values in the tree description table according to the first embodiment.

The meaning of a tree description table 900 completed in this manner will be described with reference to FIG. 20. As described above, combinations of depths and record numbers (Rec No) are arranged in the tree description table 900. For example, a value in the entry of depth specifies the depth of a table with which the value is associated, and a record numbers specifies the record number of the table specified by the depth.

For example, the first combination of elements (0, 0) in the tree description table indicates an element of record number "0" in the table (organization table) at the depth "0", that is, "Tokyo head office". The next combination of elements (1, 0) indicates an element of record number "0" in the table (employee assignment table) at the depth "1", that is, "Tokyo head office" and "Mr./Ms. A". Similarly, the subsequent combinations of elements (2, 0) and (2, 7) indicate elements of record numbers "0" and "7", respectively, in the table (employee career table) at the depth "2", that is, "Mr./Ms. A" and "Prj-1", and "Mr./Ms. A" and "Prj-4". Thus, it can be understood that a tree description table describes plural joined tables in a tree structure.

In this manner, according to this embodiment, by designating a desired table, it is possible to create a tree description table by the above-described processing and to describe joined tables in a tree structure.

Next, a second embodiment of this invention will be described. In the first embodiment, a tree description table formed by joining the whole sets of table-format data is generated, whereas in the second embodiment, subsets are used that are formed by searching a part of table-format data by a predetermined entry and sorting. Also in the second embodiment, the hardware structure of a system (FIG. 1) and the outline of conversion processing to a tree structure (FIG. 4) are substantially the same as in the first embodiment.

Figure 22:
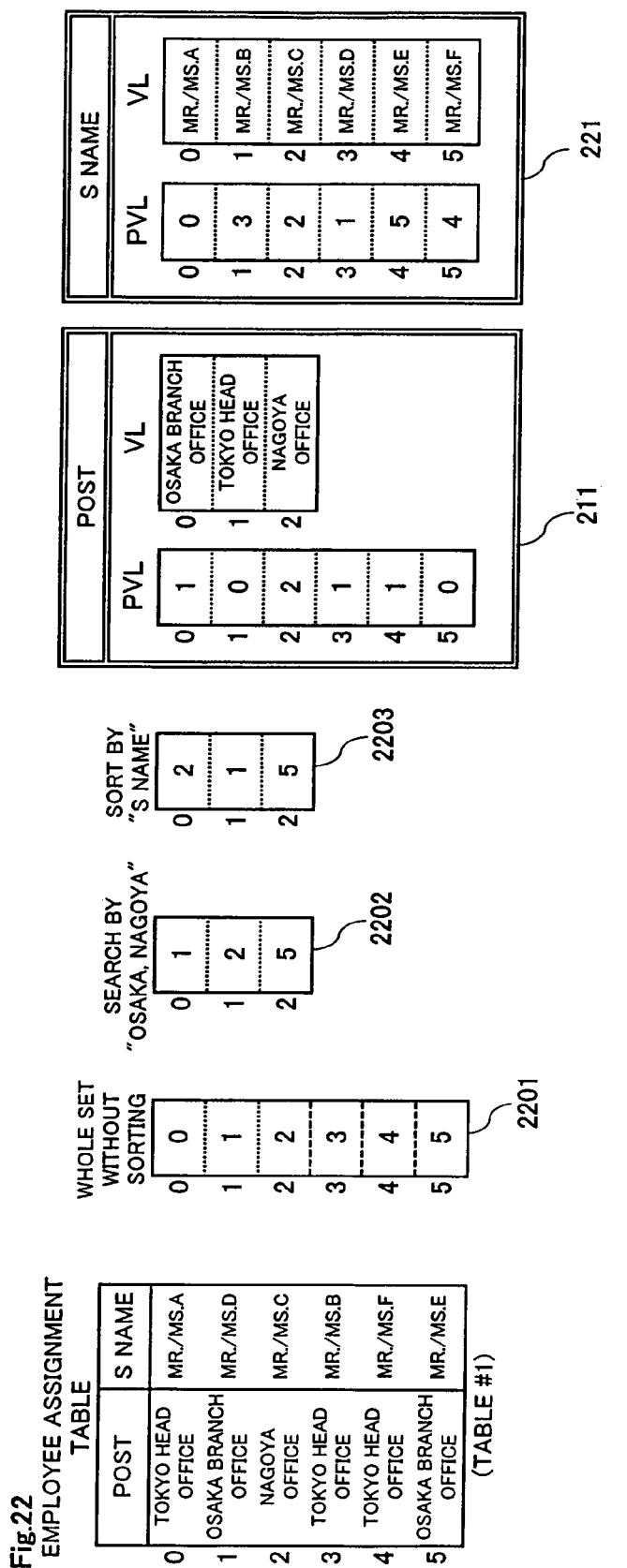
FIG. 22 is a view showing another example of table-format data and examples of information blocks based on the table-format data.

FIGS. 21 to 23 are views showing examples of table-format data (tables) according to the second embodiment. In the second embodiment, as an organization table and an employee career table, the same tables as in the first embodiment are used (see 201 in FIG. 21 and 301, 311 in FIG. 23), and their whole sets are used as subjects to be joined (see 2101 in FIG. 21 and 2301 in FIG. 23). On the other hand, though the same employee assignment table as in the first embodiment is used (see 211, 221 in FIG. 22), the table is OR-searched by "Osaka branch office" and "Nagoya office" in the entry "post" (see 2202 in FIG. 22) and sorted by the entry "S name" (see 2203 in FIG. 22).

The joining (join #0) of these table-format data by using "organization name"("post") as a key is the joining of whole sets (see 2101 and 2201). On the other hand, the joining (join #1) by using "S name" ("R name") as a key is the joining of a subset formed by searching and sorting (see 2203 in FIG. 22) and a whole set (see 2301 in FIG. 23).

Figure 24:
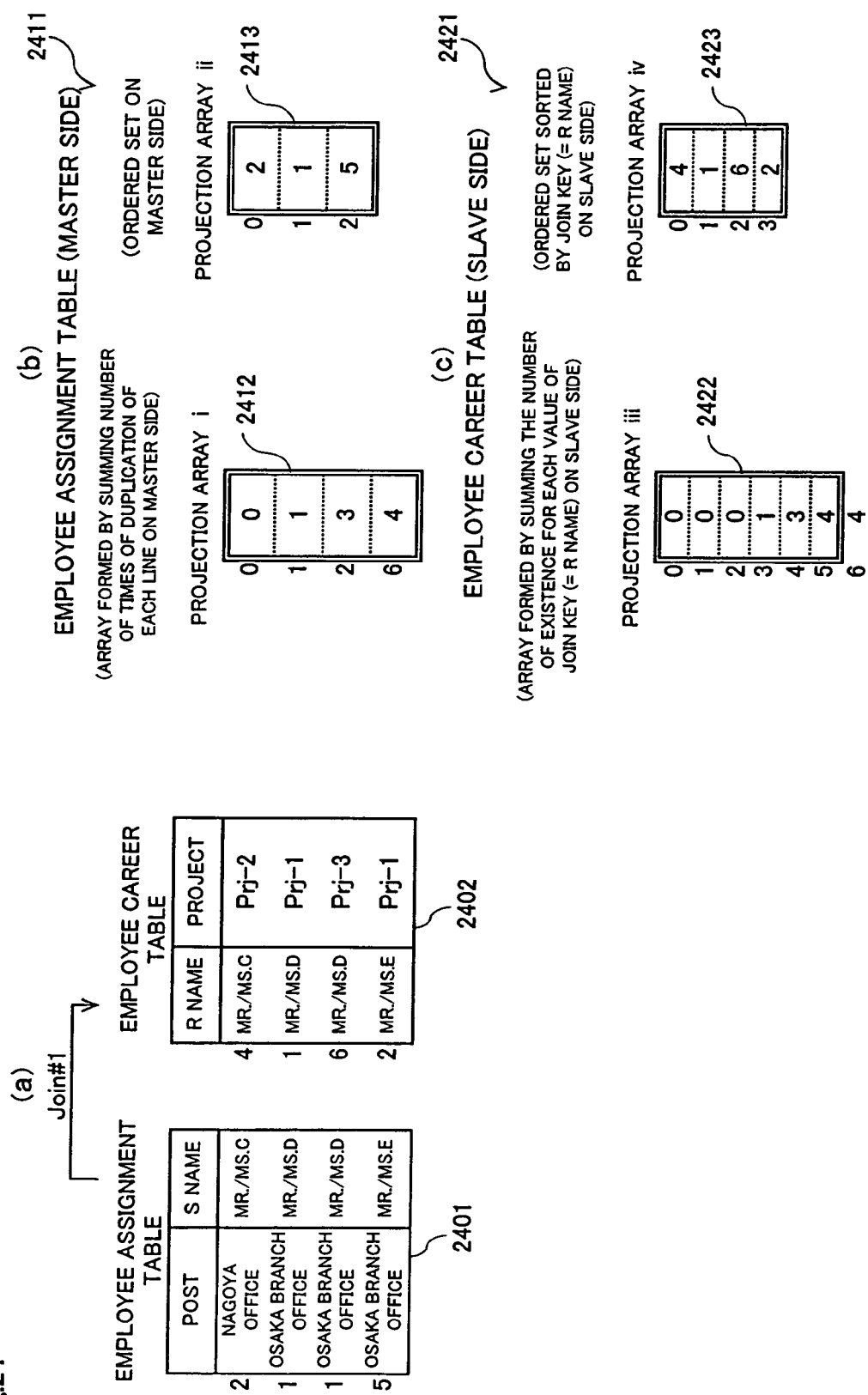
FIG. 24 is a view for explaining an employee assignment table and an employee career table according to a second embodiment.

Since the arrays created for the joining (join #0) using "organization name" ("post") as a key are related to the whole sets, these arrays are the same as the arrays shown in FIG. 5. On the other hand, the joining (join #1) using "S name" ("R name") is performed as shown in FIG. 24. As shown in FIG. 24, in this joining (join #1), various arrays are created with respect to an employee assignment table (master side) 2401 formed by performing OR search by "Osaka branch office" and "Nagoya office" in the entry "post" and sorting by the entry "S name", and an employee career table (slave side) 2402 containing the same "R names" as the "S names" extracted by the OR search.

As shown in FIG. 24(b), for the master side, a projection array "i" 2412 formed by aggregating the number of times of duplication of each line on the master side, and a projection array "ii" 2413, which is an ordered set on the master side, are generated. On the other hand, as shown in FIG. 24(c), for the slave side, a projection array "iii" 2422 formed by summing the number of times of duplication of each line in the join table for each value in the entry used as a key in the joining "join #1", that is, "R name", and a projection array "iv" 2423, which is an ordered set sorted by the entry used as the key. The meanings of these various arrays and their elements are similar to those in the first embodiment described with reference to FIGS. 5 and 6.

Figure 25:
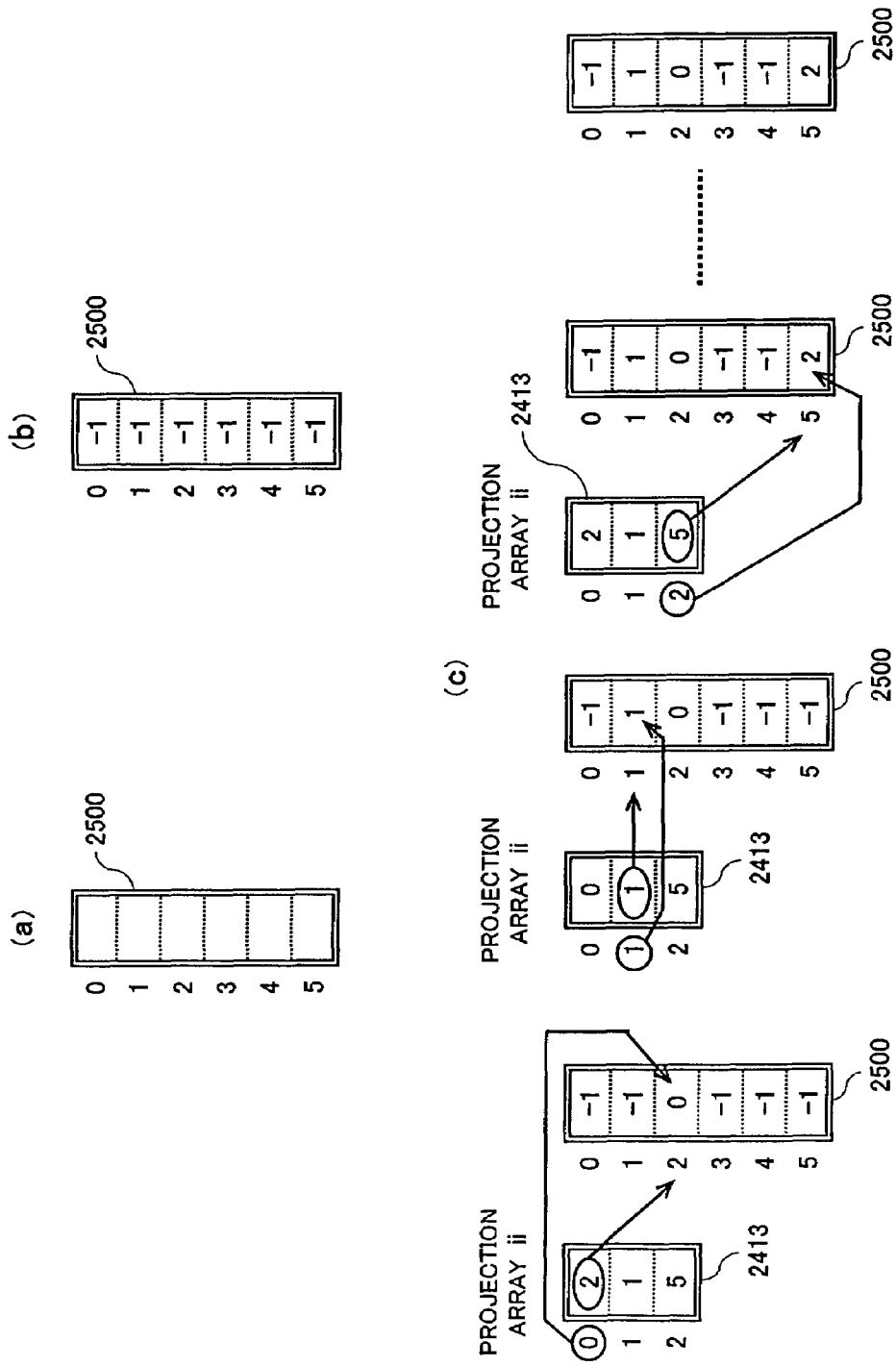
FIG. 25 is a view for explaining generation of a reverse mapping array according to the second embodiment.

Next, the creation of a reverse mapping array (step 402 in FIG. 4) will be described. The creation of a reverse mapping array is basically the same as in the first embodiment. However, the number of elements in the reverse mapping array corresponds to the total number of records in the employee assignment table (master side) (see FIG. 25(a)). Then, as in the first embodiment, a value (for example, "−1") that cannot be a record number is provided to each element as shown in FIG. 25(b), and then, the number in the original array (record number) is arranged at the element indicated by the value in the original array, as shown in FIG. 25(c). In this manner, a reverse mapping array 2500 as shown at the right end in FIG. 25(c) can be provided. In the second embodiment, it should be noted that the elements in the reverse mapping array include elements that do not indicate record numbers.

Figure 26:
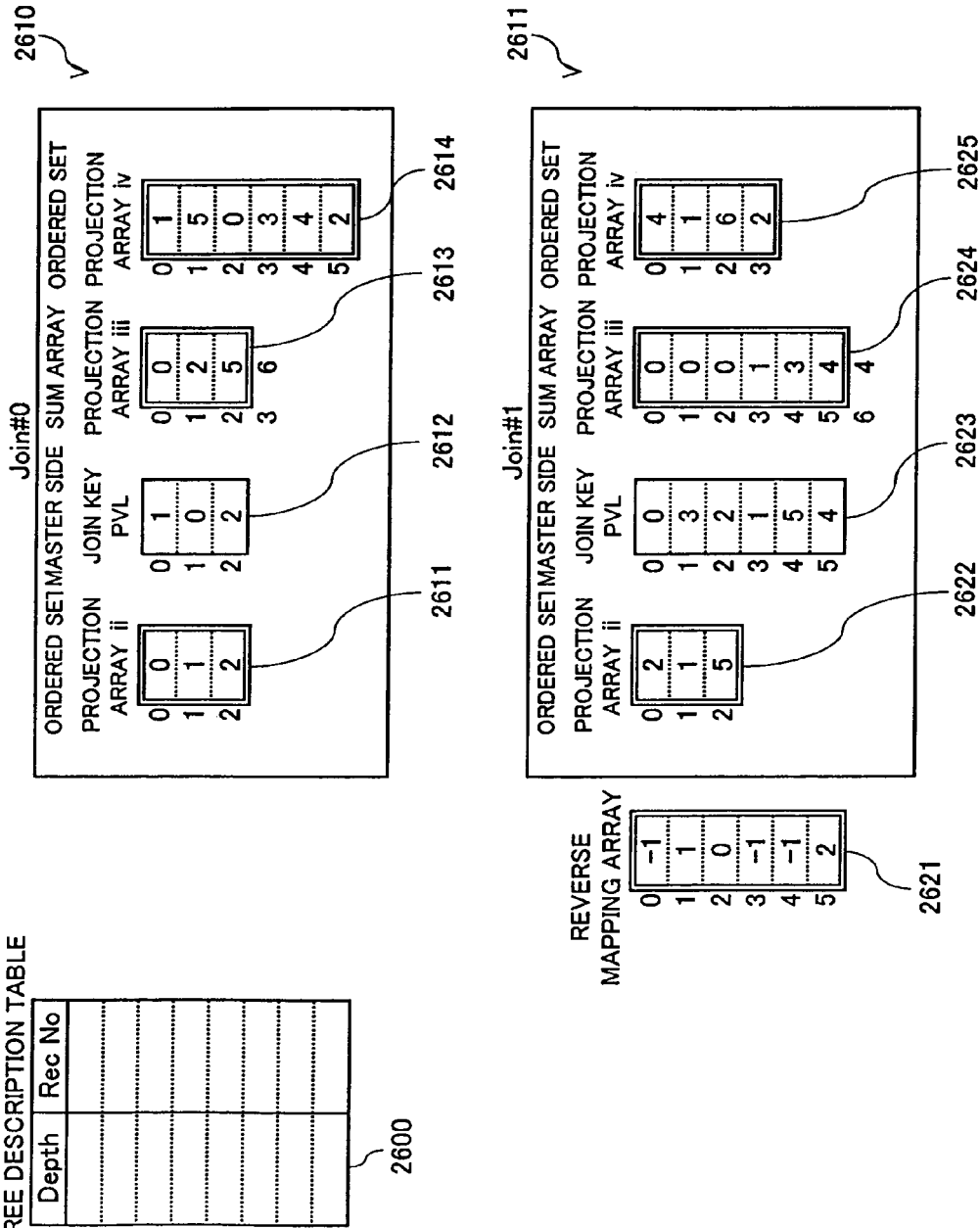
FIG. 26 is a view showing various arrays used for generating a tree description table according to the second embodiment.

After the various projection arrays and the reverse mapping array are generated in this manner, the processing of steps 404 to 411 in FIG. 4 is repeated to complete a tree description table. FIG. 26 is a view showing array groups and the like used for creating the tree description table. As shown in FIG. 26, a secured area for the tree description table, a first array group 2610 related to the first joining (join #0), that is, related to the joining of the organization table and the employee assignment table, a second array group 2620 related to the second joining (join #1), that is, related to the joining of the employee assignment table and the employee career table, and a reverse mapping array 2621 associating these array groups with each other are used for creating the tree description table.

The first array group 2610 is similar to the first array group 910 shown in FIG. 9. It contains an ordered set (projection array "ii") 2611, a join key PVL 2612, a sum array (projection array "iii") 2613 and an ordered set (projection array "iv") 2614 with respect to the first joining (join #0). Similarly, the second array group 2620 contains an ordered set (projection array "ii") 2622, a join key PVL 2623, a sum array (projection array "iii") 2624 and an ordered set (projection array "iv") 2625 with respect to the second joining (join #1).

Figure 27:
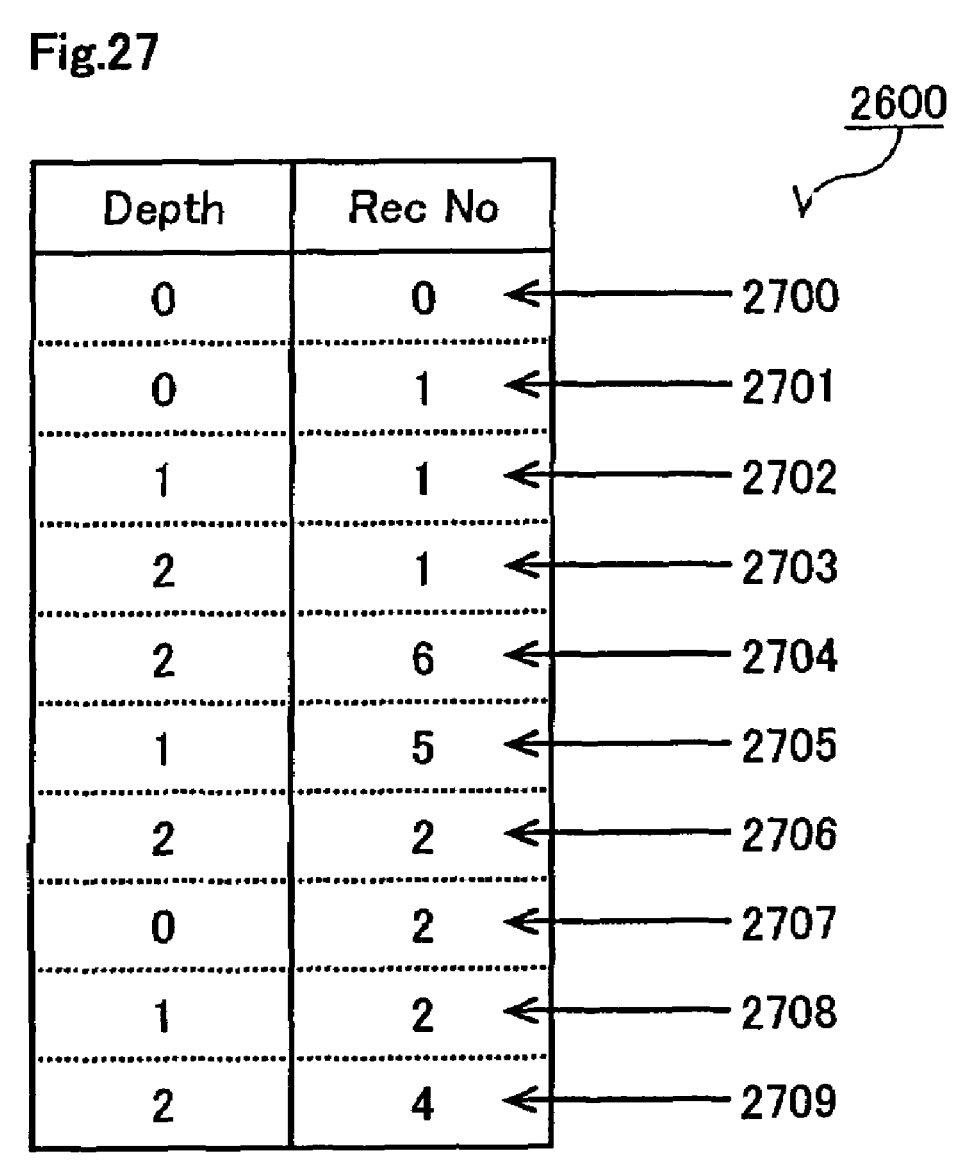

As shown in FIG. 27, in a tree description table 2600, combinations of depths and record numbers (Rec No) are sequentially arranged.

In the processing to arrange elements in the tree description table, first, the depth is initialized to "0 (zero)" (step 404 in FIG. 4), and then, an element at the current depth is acquired and arranged together with the depth (steps 405 to 407). Initially, the element of line number "0"in the ordered set (projection array "ii") with respect to the first joining (join #0) is arranged as the first element (see 2700) in the tree description table 2600, as shown in FIG. 28.

Figure 29:
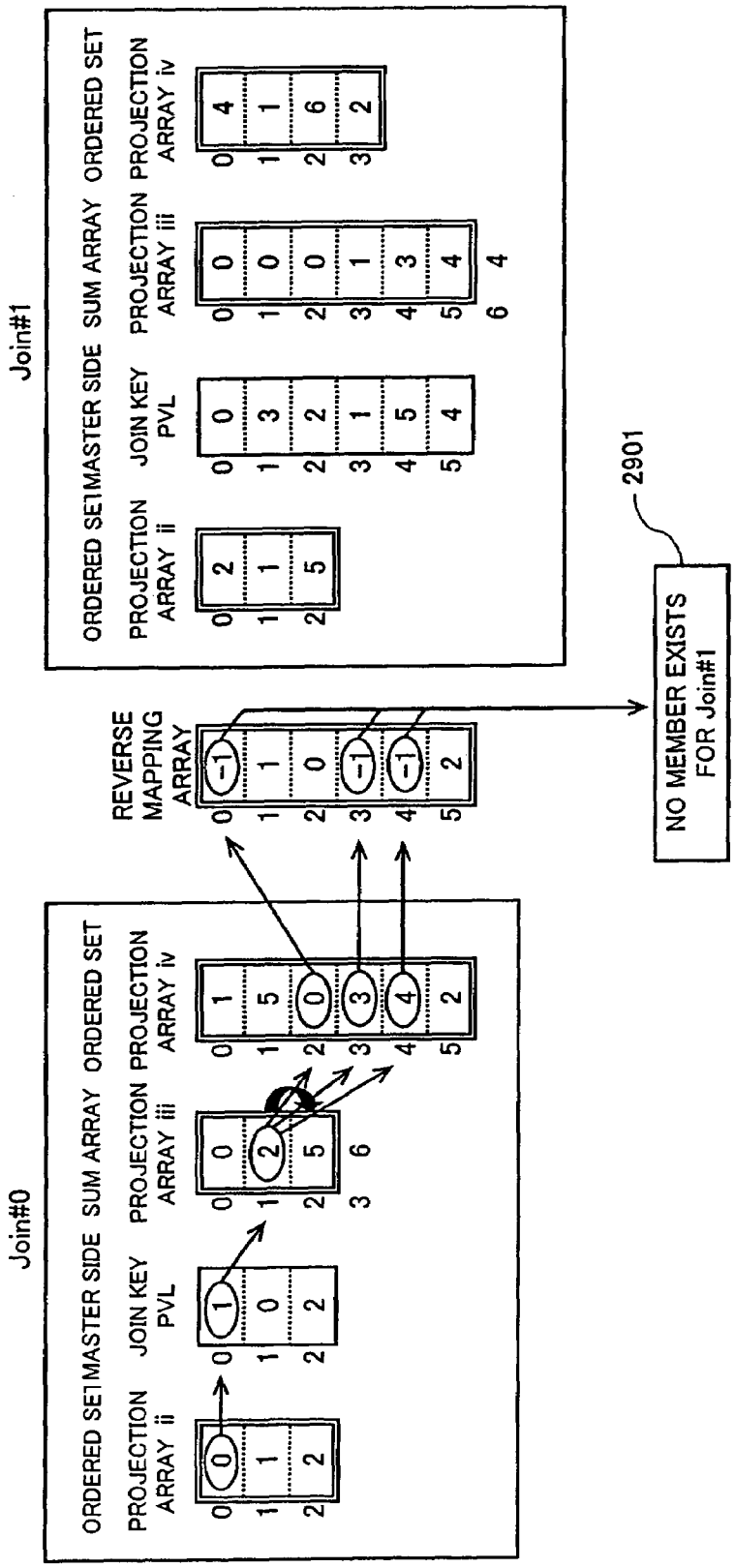
FIG. 29 is a view for explaining processing to arrange values in the tree description table according to the second embodiment.
Figure 31:
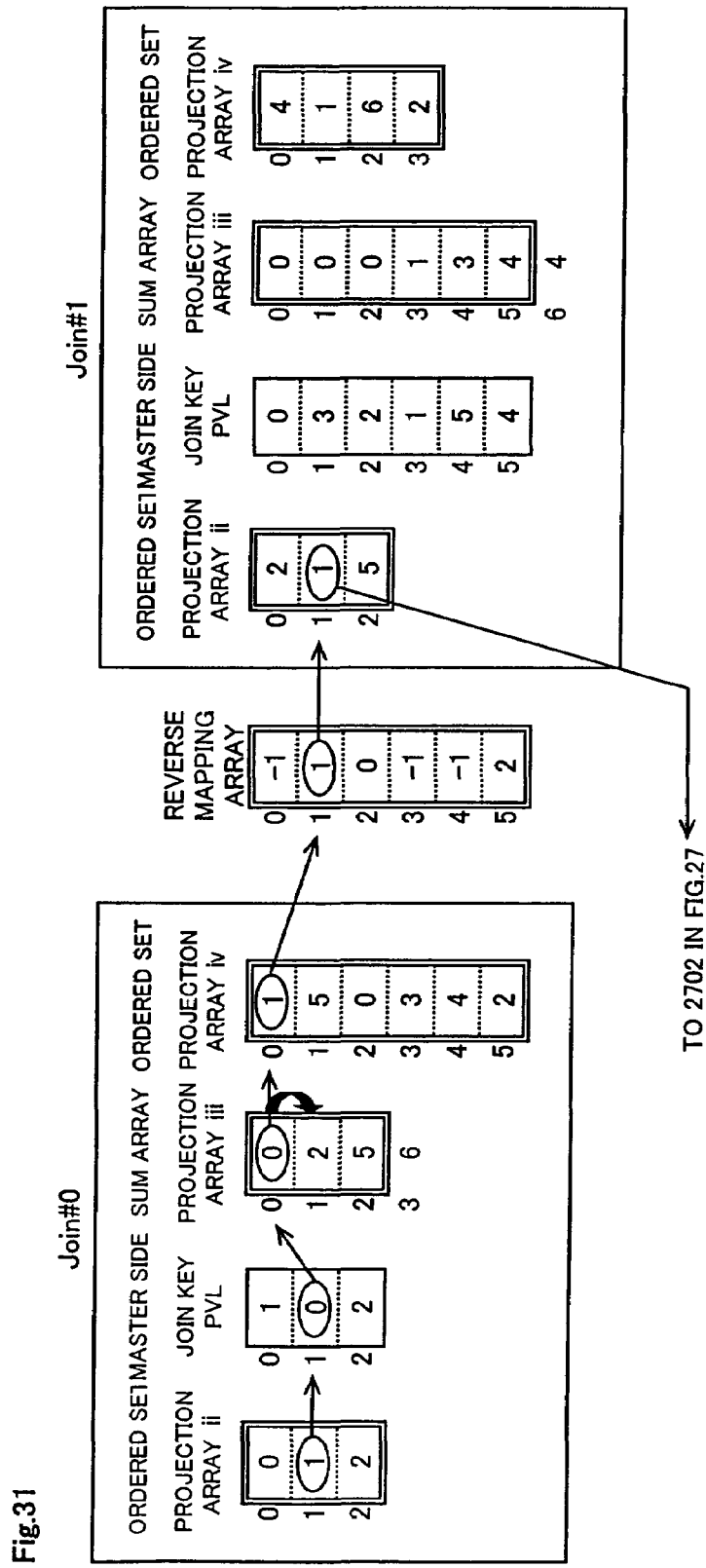
FIG. 31 is a view for explaining processing to arrange values in the tree description table according to the second embodiment.

Next, according to FIG. 4, it is judged whether a "members" exists or not (step 408). With respect to the first joining (join #0), as a result of tracing corresponding elements in the PVL, sum array (projection array "iii") and ordered set (projection array "iv") from the element of line number "0" in the ordered set (projection array "ii"), all the three elements indicated in the reverse mapping array become "−1", as shown in FIG. 29. Since the element "−1" in the reverse mapping array indicates that no record exists, as described above, it is indicated here that no element to be a "member" exists with respect to the second joining (join #1) (see 2901).

Therefore, in the processing of FIG. 4, the result of the judgment at step 408 is "No" and the next element at the same depth "0" is acquired (see step 405). In the above-described example, the element "1" of line number "1" in the ordered set (projection array "ii") is arranged together with the depth "0" (see 2701) in the tree description table, as shown in FIG. 30.

Next, it is judged whether an element to be a "member" exists or not. As a result of tracing corresponding elements in the PVL, sum array (projection array "iii"), ordered set (projection array "iv") and reverse mapping array from the element in the ordered set (projection array "ii"), the element in the ordered set (projection array "ii") with respect to the second joining (join #1) is specified. Therefore, the element "1" of line number "1" in this ordered set (projection array "ii") is arranged together with the depth "1" (see 2702) in the tree description table.

Furthermore, it is judged whether an element to be a "member" exists or not. In the above-described example, the elements in the PVL, sum array (projection array "iii") and ordered set (projection array "iv") are specified from the element in the ordered set with respect to the second joining (join #1), and two elements in the ordered set (projection array "iv") are arranged together with the depth "2" (see 2703 and 2704) in the tree description table.

Figure 33:
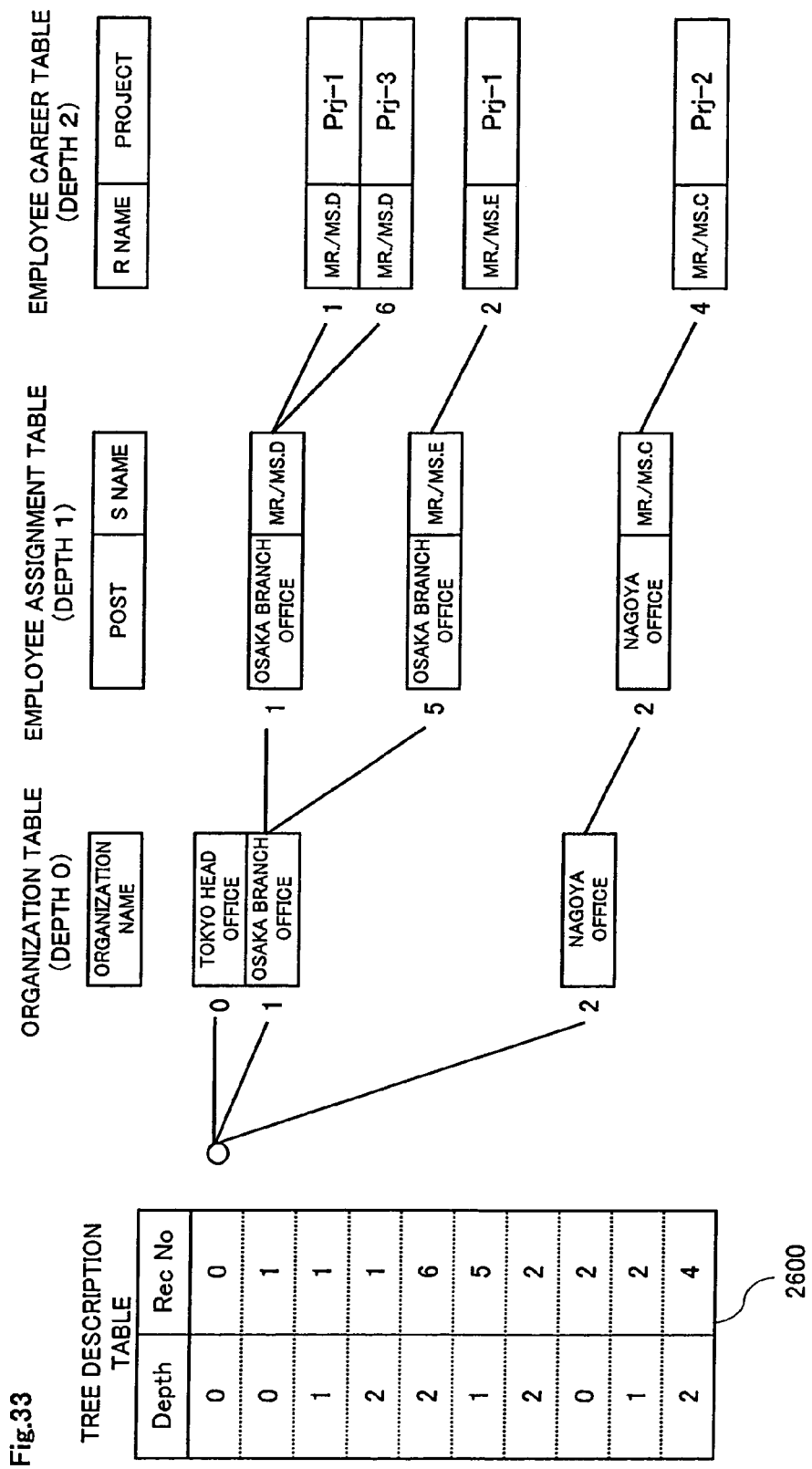
FIG. 33 is a view for explaining processing to arrange values in the tree description table according to the second embodiment.

By repeating such processing, it is possible to complete the tree description table as shown in FIG. 27. The meaning of the tree description table completed in this manner is similar to the meaning in the first embodiment described with reference to FIG. 20. As shown in FIG. 33, a value in the entry of depth in the tree description table specifies the depth of the table with which the value is associated, and the corresponding record number specifies the record number of the table specified by the depth.

In FIG. 33, for example, by the first combination of elements (0, 0), the element of record number "0" in the table (organization table) at the depth "0", that is, "Tokyo head office", is indicated. By the next combination of elements (0, 1), the element of record number "1" in the table (organization table) at the depth "0", that is, "Osaka branch office", is indicated. Similarly, by the subsequent combinations of elements (1, 1) and (2, 1), the element of record number "1" in the table (employee assignment table) at the depth "1" and the element of record number "1" in the table (employee career table) at the depth "2", that is, "Osaka branch office" and "Mr./Ms. D", and "Mr./Ms. D" and "Prj-1", are indicated.

According to these embodiments, it is possible to set a route to an arbitrary node and thus construct a tree structure. For example, in the second embodiment, a tree structure as indicated by 3400 in FIG. 34 can be constructed. By using this embodiment, it is possible to reconstruct a tree structure using an arbitrary entry as a route. For example, in FIG. 34, it is possible to select "Osaka branch office" and "Mr./Ms. D" of line number "1" in the employee assignment table, as a route, and thus construct a new tree structure 3410.

In the case of constructing a tree structure, a group of records (table-format data) to be a group of owner nodes, and a group of records (table-format data) to be a group of member nodes may be selected and joined. By repeating this in a chained manner a desired number of times and then creating a tree description table, it is possible to construct a tree structure having an arbitrary depth.

According to the first and second embodiments, a tree structure can be constructed by joining plural table-format data at a very high speed. For example, by using a "Pentium® 4" processor (1.8 GHz), it is possible to arranged values in a tree description table at a speed of approximately 10 million lines per second, except for creation of various arrays related to joining. This speed is approximately 100 to 1000 times faster than in the conventional technique.

Figure 34:
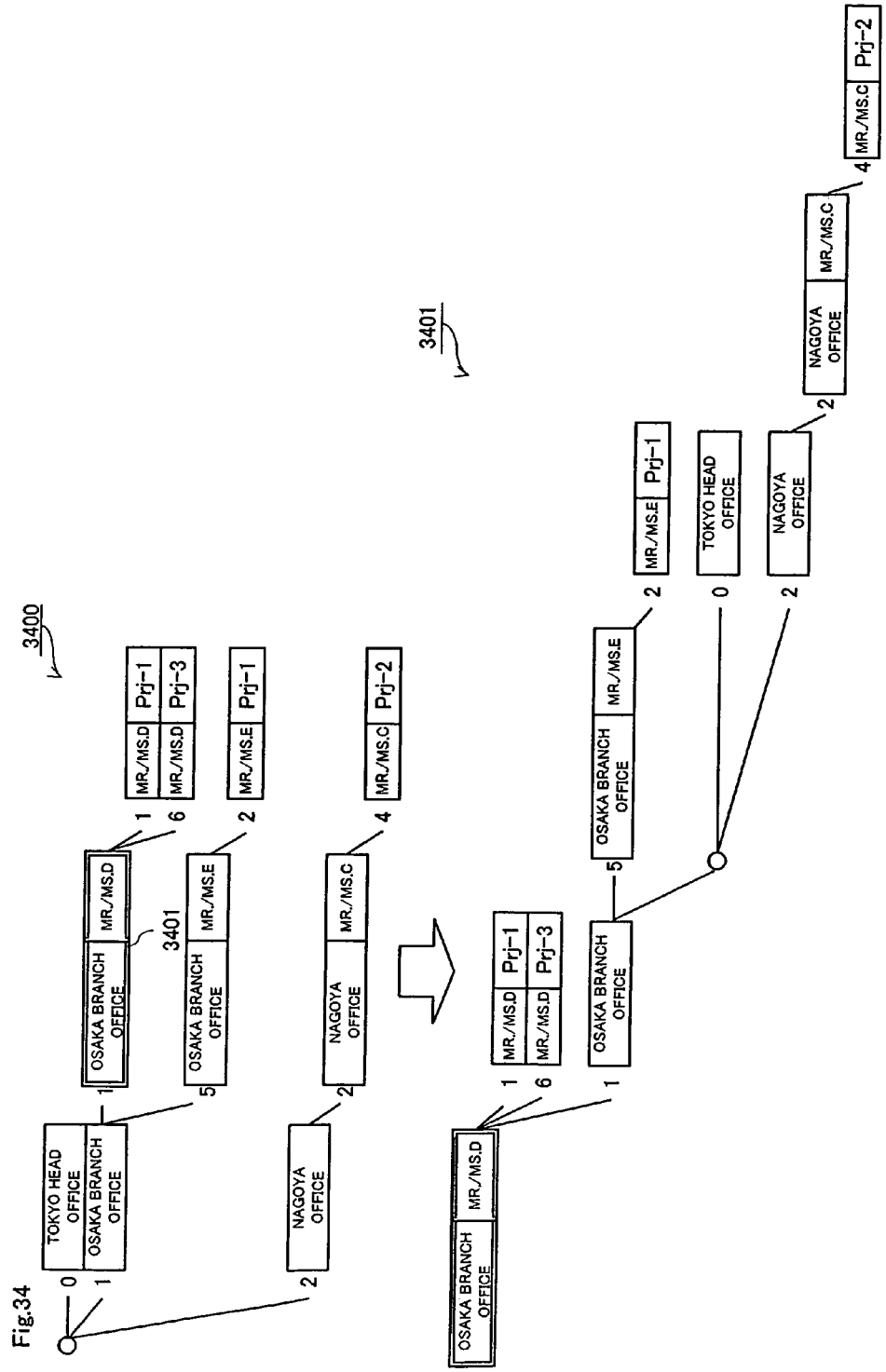
FIG. 34 is a view showing still another example of tree structure according to this invention.

As described with reference to FIG. 34, a tree structure using an arbitrary node as a route can be constructed and very high flexibility is realized. Since a tree structure is expressed by a tree description table, it is possible to hold plural different tree structures based on the same table-format data. For example, it is possible to express a list of employees in the form of a tree based on their posts and also express the same list in the form of a tree based on their birthplaces.

Moreover, sorting and totaling can be combined (see the second embodiment).

Also, the memory area to be used can be made compact, compared with the conventional tree structure. For example, in an XML database, since a character string representing a path name is embedded in connection information of a node, an extremely large memory area is required. On the other hand, according to this embodiment, a tree structure can be described on the basis of a tree description table. According to an experiment made by the present inventor, a tree structure with respect to stock price information could be expressed by using a memory area that is ⅕ of a memory area used for an XML database.

This invention is not limited to the above-described embodiments. It is a matter of course that various modifications can be made within the scope of the invention described in the claims and that these modifications can be included in the scope of the invention.

For example, while three table-format data are joined in a chained manner in the above-described embodiments, the number of times of chaining is not limited to this.

Also, in the first embodiment, a reverse mapping array is provided between certain joining and the next joining. However, this reverse mapping array may be omitted if the whole sets of table-format data are used.

Moreover, while a predetermined program is read into and executed in the general computer system 10 to realize joining of plural table-format data and processing related to the joined table-format data in the above-described embodiments, this invention is not limited to this. It is a matter of course that a board computer dedicated to database processing is connected to a general computer system such as a personal computer to enable the board computer to execute the above-described processing. Therefore, in this description, the term "means" does not necessarily refer to a physical means and the function of each means may be realized by software and/or hardware. Moreover, the function of one means may be realized by two or more physical means, or the functions of two or more means may be realized by one physical means.

This invention can be utilized, for example, for processing (BOM expansion) to create a bill of material (BOM) based on a material list held in an RDB. This invention also makes it possible to systematically and smoothly manage a flow characterized by splitting and merging. For example, in the case of managing information about certain food (for example, stock farm meat), that is, what part of each stock animal is sold there and what route is taken, such information is expressed as data in a tree form. Generally, with respect to products produced in the primary and secondary industries, the data is spread in a tree form until these products are consumed or changed in form. In this manner, this invention makes is possible to construct a tree structure in a splitting state and manage this tree structure. Also, according to this invention, it is possible to grasp expansion of a tree with the lapse of time by creating a tree description table.

Meanwhile, tree-form data is also used in the case of purchasing various parts, energy and services to produce a certain industrial product. For example, to produce an automobile (end product), an ignition plug is purchased from a certain parts manufacturer. The parts manufacturer purchases electric power from an electric power company and ceramics, which is a material of the ignition plug, from another parts manufacturer. In this manner, the tree spreads retroactively. In this invention, it is also possible to construct a tree structure in a merging state and manage this tree structure.

According to this invention, it is possible to provide a method and program that enables selection of an arbitrary root, construction of one or more desired tree structures at a high speed, and execution of search, totaling and sorting at a high speed.

INDUSTRIAL APPLICABILITY

This invention can be applied particularly to a system that manages a large volume of data, for example, database or data warehouse. More specifically, this invention is suitable for key service management and business management such as BOM expansion in SCM (supply chain management).

The invention claimed is:

1. A method of connecting a plurality of table-format data, each table-format data being expressed as a record array containing an entry and an entry value included in the entry, and converting the connected table-format data as join tables to a tree structure, the method comprising the steps of:
   (a) dividing each table-format data into one or more information blocks, each information block containing a value list in which entry values belonging to specified entries are stored in order of entry value numbers corresponding to the entry values and a pointer array in which pointer values indicating the entry value numbers are stored in univocal order of record numbers;
   (b) selecting two table-format data in which an entry is made common;
   (c) finding an entry that is made common in the selected two table-format data;
   (d) determining table-format data on which default sorting order is reflected, as master table-format data, of specified information blocks, and determining other table-format data as slave table-format data;
   (e) in the case where value lists contained in the specified information blocks are equalized with each other in the selected two table-format data, generating a master-side projection array for the master table-format data, wherein the master-side projection array is formed by summing up the number of times of duplication of each line, and generating a master-side ordered set for the master table-format data and also a slave-side projection array for the slave table-format data, wherein the slave-side projection array is formed by summing up the number of times of duplication of each line in a join table, and generating a slave-side ordered set for the slave table-format data, wherein the slave-side ordered set is sorted by entry used as a key for joining;
   (f) repeating steps (b), (c), (d) and (e), and when there is a table which is joined with the slave table-format data of the two table-format data, using the slave table-format data as master table-format data;
   (g) generating a reverse mapping array between one join table and a subsequent join table using the master-side projection array as an original array for the subsequent join table;
   (h) selecting one of the table-format data connected by joining to be a root, and determining depth of each table-format data in accordance with the connection of the table-format data;
   (i) securing an area for a tree description table having as a value a combination of the depth and a record number;
   (j) initializing a current depth to the depth of the table-format data to be the root of the tree structure;
   (k) specifying a record in the master-side ordered set for the join table corresponding to the current depth, and arranging a value indicating the record together with the depth into the area for the tree description table;
   (l) acquiring an element in the master-side ordered set for the subsequent join table by tracing the slave-side projection array and the slave-side ordered set corresponding to the master-side ordered set for the join table on the current depth, as well as, when present, the reverse mapping array and the master-side projection array for the subsequent join table; and
   (m) repeating steps (k) and (l) with sequentially searching in the direction of the depth until no further elements are acquired.

2. The method as claimed in claim 1, characterized in step (g), wherein the reverse mapping array is omitted when all of the plurality of table-format data are used.

3. The method as claimed in claim 2, further comprising the step of:
   performing one of searching, totaling and sorting with respect to the entry that is made common in at least one of the two table-format data in which the entry is made common.

4. The method as claimed in claim 1, further comprising the step of:
   performing one of searching, totaling and sorting with respect to the entry that is made common in at least one of the two table-format data in which the entry is made common.

5. A memory device storing a program for connecting a plurality of table-format data, each table-format data being expressed as a record array containing an entry and an entry value included in the entry, and converting the connected table-format data as join tables to a tree structure, the program characterized by causing a computer operably connected to the memory device to execute the steps of:
   (a) dividing each table-format data into one or more information blocks, each information block containing a value list in which entry values belonging to specified entries are stored in order of entry value numbers corresponding to the entry values and a pointer array in which pointer values indicating the entry value numbers are stored in univocal order of record numbers;
   (b) selecting two table-format data in which an entry is made common;
   (c) finding an entry that is made common in the selected two table-format data;
   (d) determining table-format data on which default sorting order is reflected, as master table-format data, of specified information blocks, and determining other table-format data as slave table-format data;
   (e) in the case where value lists contained in the specified information blocks are equalized with each other in the selected two table-format data, generating a master-side projection array for the master table-format data, wherein the master-side projection array is formed by summing up the number of times of duplication of each line, and generating a master-side ordered set for the master table-format data and also a slave-side projection array for the slave table-format data, wherein the slave-side projection array is formed by summing up the number of times of duplication of each line in a join table, and generating a slave-side ordered set for the slave table-format data, wherein the slave-side ordered set is sorted by entry used as a key for joining;
   (f) repeating steps (b), (c), (d) and (e), and when there is a table which is joined with the slave table-format data of the two table-format data, using the slave table-format data as master table-format data;

(g) generating a reverse mapping array between one join table and a subsequent join table using the master-side projection array as an original array for the subsequent join table;

(h) selecting one of the table-format data connected by joining to be a root, and determining depth of each table-format data in accordance with the connection of the table-format data;

(i) securing an area for a tree description table having as a value a combination of the depth and a record number;

(j) initializing a current depth to the depth of the table-format data to be the root of the tree structure;

(k) specifying a record in the master-side ordered set for the join table corresponding to the current depth, and arranging a value indicating the record together with the depth into the area for the tree description table;

(l) acquiring an element in the master-side ordered set for the subsequent join table by tracing the slave-side projection array and the slave-side ordered set corresponding to the master-side ordered set for the join table on the current depth, as well as, when present, the reverse mapping array and the master-side projection array for the subsequent join table; and (m) repeating steps (k) and (l) with sequentially searching in the direction of the depth until no further elements are acquired.

6. The memory device storing the program as claimed in claim 5, wherein the program causes the computer to execute the steps further characterized in step (g), wherein the reverse mapping array is omitted when all of the plurality of table-format data are used.

7. The memory device storing the program as claimed in claim 6, wherein the program further causes the computer to execute the step of:

performing one of searching, totaling and sorting with respect to the entry that is made common in at least one of the two table-format data in which the entry is made common.

8. The memory device storing the program as claimed in claim 5, wherein the program further causes the computer to execute the step of:

performing one of searching, totaling and sorting with respect to the entry that is made common in at least one of the two table-format data in which the entry is made common.

* * * * *